United States Patent
Bechtel et al.

(10) Patent No.: US 9,641,773 B2
(45) Date of Patent: May 2, 2017

(54) HIGH DYNAMIC RANGE IMAGING DEVICE

(71) Applicant: Gentex Corporation, Zeeland, MI (US)

(72) Inventors: Jon H. Bechtel, Holland, MI (US); Jeremy C. Andrus, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 264 days.

(21) Appl. No.: 14/151,950

(22) Filed: Jan. 10, 2014

(65) Prior Publication Data

US 2014/0125854 A1    May 8, 2014

Related U.S. Application Data

(62) Division of application No. 12/082,215, filed on Apr. 9, 2008, now Pat. No. 8,629,927.

(51) Int. Cl.
  *H04N 5/355* (2011.01)
  *H04N 5/374* (2011.01)
  *B60R 1/12* (2006.01)

(52) U.S. Cl.
  CPC ..... *H04N 5/35527* (2013.01); *H04N 5/35581* (2013.01); *H04N 5/374* (2013.01); *B60R 2001/1253* (2013.01)

(58) Field of Classification Search
  CPC .......................... H04N 5/35527; H04N 5/374
  See application file for complete search history.

(56) References Cited

U.S. PATENT DOCUMENTS

| | | | |
|---|---|---|---|
| 5,027,148 A | 6/1991 | Anagnostopoulos | |
| 5,105,264 A | 4/1992 | Erhardt | |
| 5,748,303 A | 5/1998 | Korta et al. | |
| 5,892,541 A | 4/1999 | Merrill | |
| 6,175,383 B1 | 1/2001 | Yadid-Pecht et al. | |
| 6,552,747 B1 | 4/2003 | Hasegawa | |
| 6,580,454 B1 | 6/2003 | Perner et al. | |
| 6,606,121 B1 | 8/2003 | Boem et al. | |
| 6,714,239 B2 * | 3/2004 | Guidash | H01L 27/14609 257/E27.132 |
| 6,765,619 B1 | 7/2004 | Deng et al. | |
| 6,831,689 B2 | 12/2004 | Yadid-Pecht | |
| 6,873,360 B1 | 3/2005 | Kawashiri | |
| 6,963,369 B1 | 11/2005 | Olding | |
| 6,963,370 B2 | 11/2005 | Dicarlo et al. | |
| 6,975,355 B1 | 12/2005 | Yang et al. | |
| 6,977,685 B1 | 12/2005 | Acosta-Serafini et al. | |
| 7,079,178 B2 | 7/2006 | Hynecek | |
| 7,142,240 B1 | 11/2006 | Hua et al. | |
| 7,202,463 B1 | 4/2007 | Cox | |

(Continued)

FOREIGN PATENT DOCUMENTS

| | | |
|---|---|---|
| WO | WO9001844 | 2/1990 |
| WO | WO0109717 | 2/2001 |

OTHER PUBLICATIONS

Sung-Hyung Yang & Kyoung-Rok Cho, High Dynamic Range CMOS Image Sensor with Conditional Reset, IEEE 2002 Custom Integrated Circuits Conf pp. 265-268, Cheongju Chungbuk, Korea.

*Primary Examiner* — Amy Hsu
(74) *Attorney, Agent, or Firm* — Price Heneveld LLP; Bradley D. Johnson

(57) ABSTRACT

The present invention relates to improved imaging devices having high dynamic range and to monitoring and automatic control systems incorporating the improved imaging devices.

12 Claims, 14 Drawing Sheets

(56) References Cited

U.S. PATENT DOCUMENTS

| | | |
|---|---|---|
| 7,362,355 B1 | 4/2008 | Yang et al. |
| 7,432,967 B2 | 10/2008 | Bechtel et al. |
| 7,554,067 B2 | 6/2009 | Zarnowski et al. |
| 7,598,998 B2 | 10/2009 | Cernasov et al. |
| 7,701,499 B2 | 4/2010 | Barnea et al. |
| 7,773,137 B2 | 8/2010 | Inoue |
| 7,791,657 B2 | 9/2010 | Joshi et al. |
| 7,796,171 B2 | 9/2010 | Gardner |
| 7,924,332 B2 | 4/2011 | Gruev et al. |
| 7,924,333 B2 | 4/2011 | Yin et al. |
| 7,964,835 B2 * | 6/2011 | Olsen .................. G02B 3/0062 250/208.1 |
| 8,119,967 B2 | 2/2012 | O |
| 8,289,430 B2 | 10/2012 | Bechtel et al. |
| 2005/0068441 A1 | 3/2005 | Parks |
| 2006/0007498 A1 * | 1/2006 | McDermott ......... H04N 5/3535 358/296 |
| 2006/0215882 A1 | 9/2006 | Ando et al. |
| 2007/0262237 A1 * | 11/2007 | Mann ................ H04N 5/37457 250/208.1 |
| 2009/0174784 A1 | 7/2009 | Karlsson et al. |
| 2010/0238135 A1 * | 9/2010 | Brown ................. G06F 3/0412 345/175 |

* cited by examiner ated to a specific embodiment of this present invention
HIGH DYNAMIC RANGE IMAGING DEVICE

CROSS REFERENCE TO RELATED APPLICATIONS

This application is a divisional application of U.S. Pat. No. 8,629,927, entitled, "IMAGING DEVICE," filed on Apr. 9, 2008, wherein the disclosure of which is hereby entirely incorporated herein by reference.

BACKGROUND

Imaging devices, including CMOS and CCD versions, are becoming popular in a number of contexts. The present invention provides an improved imaging device having high dynamic range and various apparatuses incorporating these high dynamic range imaging devices.

DETAIL DESCRIPTION

Figure 1:
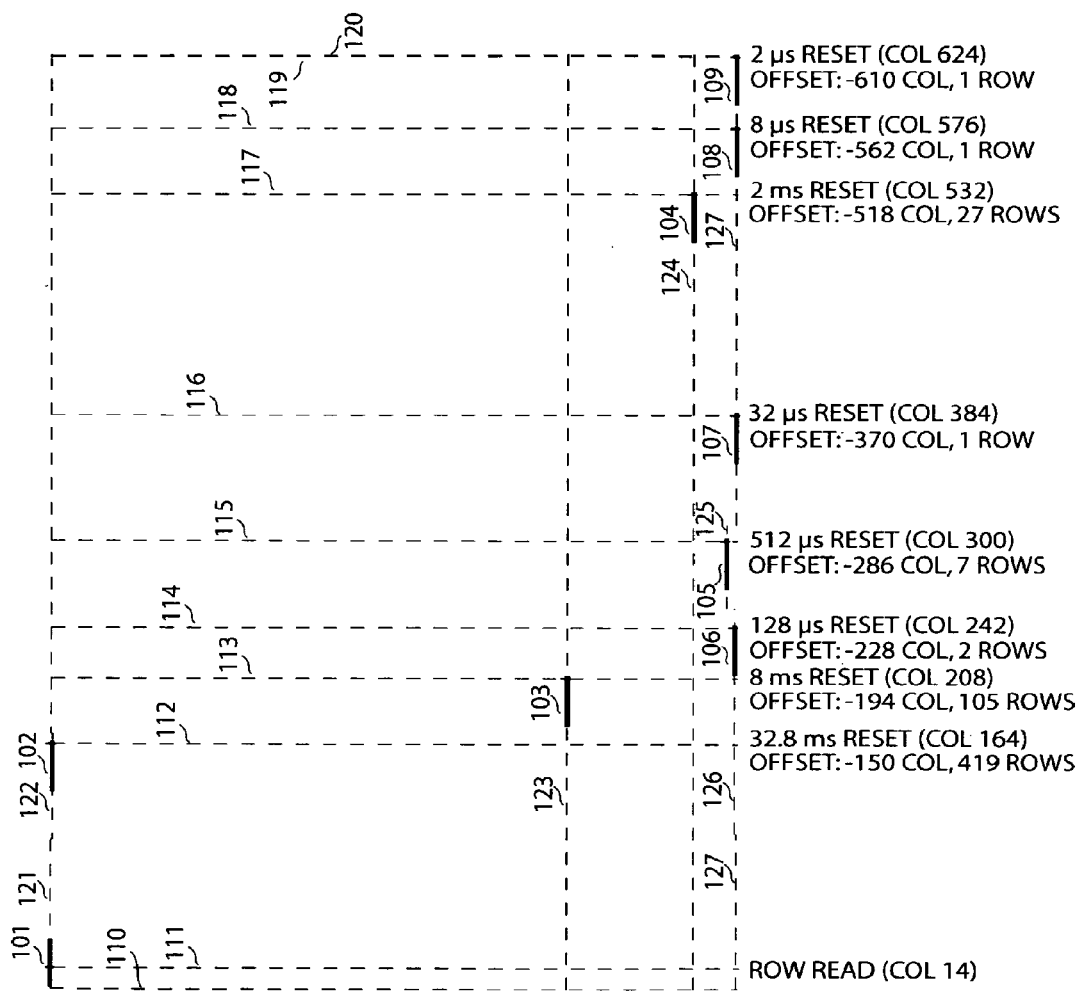
FIGS. 1 and 2 depict a pattern for a reset and row read schedule.

Consumer electronics devices, such as, digital cameras, digital video recorders, video telephones and the like are becoming commonplace. These devices along with a host of residential, commercial, industrial and vehicular vision systems have popularized CCD and CMOS based image sensors. Known systems designed to automatically control vehicle exterior lights, for example, utilize a forward looking digital imaging system to acquire images of the scene generally in front of and/or behind the controlled vehicle and analyze images to detect headlights of oncoming vehicles and taillights of leading vehicles. Security cameras are prevalent throughout residential, commercial and industrial facilities, as well as, associated vehicle parking areas. Many of these known applications induce the need for high dynamic range; light sources within the scene comprise such drastically varying relative brightness that a given pixel exposure may not allow for detection of dim light sources while not saturating due to bright light sources. It is desirable to utilize a given digital imaging system to provide sufficient contrast in a wide range of ambient lighting, for example, detecting light sources at night along with being able to distinguish various objects within a given scene during the day. During the day, objects in the scene are primarily illuminated by the sun rather than the objects themselves being sources of light (i.e. headlights, taillights, road signs, etc.). The present invention provides a high dynamic range image sensor capable of accurately detecting and digitally representing dim light sources, bright light sources and objects illuminated by other light sources in the same scene.

A number of imaging techniques to provide high dynamic range images are known in prior art. These include selective reset of pixels in various combinations. One embodiment in U.S. Pat. No. 6,175,383 includes choice of available integration periods for which the second available integration period is half the first, the third is half the second and so on. In other words, for a successive list of available integration periods, each available integration period is shorter than its immediate predecessor by a factor of two. The patent also notes the possibility of using nondestructive readout to determine the optimum exposure period for a region of interest. The patent depicts monitoring of pixel values by using a conventional readout of a row of pixels followed by serialized pixel by pixel processing of the pixels of the row prior to sending them to an evaluation circuit. The patent does not, however, detail a fast responding, automated method to determine what integration period to select for each pixel of the image while a readout sequence for a given image is in progress. Another prior art device incorporates a periodic sample period for which every pixel in the imager is scanned during each sample period with a mechanism for conditional reset of each pixel on each successive scan of the array. The device has a memory to record reset tasks and a single analog output to which each of the analog pixel values from the entire imaging array are presented in sequential fashion and routed to a single comparator. The inherent periodicity of this approach, the difficulty in reconstructing a useful light level value from a record of the number of resets and the final pixel reading, and the severe limitation in scan repetition rate necessary to sequence through all of the pixels of an imager array of even modest size do not make it practical to apply this approach to the wide-ranging, successively shorter integration periods taught in U.S. Pat. No. 6,175,383. Also, in a preferred embodiment of the invention of this patent, it is preferable to base the decision to reset or not reset a pixel on the integrated charge value for the pixel which is current even relative to the next to the shortest integration period. In an exemplary design of the present invention, the accumulation of enough charge to reasonably indicate if the current integration period is appropriate followed by the decision to reset to begin the shortest integration period followed by conditional reset of the pixel needs to be accomplished just 6 microseconds after the preceding reset. When the words "an exemplary", "the exemplary", or any similar variant using the word "exemplary" are used herein it is to be understood to be in reference to a specific embodiment of this present invention and in no way is meant to limit the scope of the present invention to any specific embodiment identified as exemplary. With a compare function which is shared by many pixels in a row, additional time required to serially shift pixels of a row into an amplifier and to serially compare the individual pixel outputs to a threshold value for typical row lengths of 100 or more pixels as implied by an extension of a device with a serialized compare function for the row requires unrealistically fast circuits. Also, with a compare function which is shared by many pixels in a row, the ability to cycle through the imaging array to make the final conditional reset and to again cycle through the array to read the values for the shortest integration period (just 2 µs in an exemplary design) is even more unrealistic. These are reasons for adopting equally spaced sampling for conditional reset in prior art devises for which an associated reset comparator is shared by the entire image array.

In a preferred design of the present invention, to overcome the limitations of prior art, row parallel processing is incorporated to read a signal indicative of the light induced charge for each pixel of the row; to compare the indicated level of the light induced charge against a threshold level for each pixel of the row; to, for each pixel of the row, interrogate the memory record of the reset condition; to determine whether or not to reset each pixel of the row based on the result of the comparison, the memory indication, and the stage in the readout sequence; to store an updated record of the partial reset history, as required, for each pixel of the row; and finally to conditionally reset each pixel of the row based on the above information for the respective pixel. As an option, when prior conditional resets in a pixel integration time setting sequence have determined the integration time for a particular pixel, some or, perhaps, all of the remaining steps indicated above may be bypassed prior to readout of the pixel value. In general, when any one of the determinations in the steps above make it unnecessary to use others at a particular stage of the sequence, the determination of the unneeded information may optionally be bypassed. It should be understood that "row parallel" is only one embodiment of the present invention. The term "parallel addressable group of pixels" is used elsewhere herein as being inclusive of "row parallel". Another example of "parallel addressable group of pixels" within the scope of the present invention is applicable to an imager with a bayer pattern. The set of pixels constituting a given spectrally filtered group (i.e. red filtered pixels within a row or blue pixels within a row or green pixels within a row). At the conclusion of a prescribed sequence of row parallel conditional reset tasks which are associated with a particular readout of the pixel value, the pixel value associated with the accumulated charge is preferably read and preferably converted to digital form in a conventional manner. Preferably, the readout of analog values from the row of pixels is done in a row parallel manner and the values read and temporarily stored for the row are then preferably converted to digital form. The digital record of the integration period selected for each pixel is preferably combined with the pixel readout value for the respective pixel to establish a value indicative of the received light level for the pixel. The value is preferably in a form which is directly usable so that it is not necessary to retain the separate record of the integration period used to integrate the light level to obtain the pixel reading. The encoding of this value may assume any of a large number of formats and the value may, for example, be in linear or in logarithmic form. The processed pixel value is preferably made available for readout at this point. Optionally, one or more of the steps may be accomplished by a processor which is not part of the imaging array.

Pixels which are successively reset begin a shorter integration period with each successive reset giving the pixel an effective optical sensitivity which is successively reduced in approximate proportion to the reduction in integration period for the pixel for each reset task of the sequence. It is preferable to configure the conditional reset logic so that once a conditional reset for a given pixel is skipped; the pixel will not be reset again until it is read. The pixel signal indicative of the accumulated light induced charge is accumulated for the pixel during a partial, not a full, integration time. It is preferable to select the compare threshold against which to compare the indicated pixel charge after partial integration so that the threshold is high enough that sufficient charge will be accumulated at the end of the integration time to reasonably utilize the readout range of the pixel. On the other hand the threshold is preferably not set so high that the pixel is likely to saturate before the end of the integration period. These preferences indicate a need for a balance which may change with application, with analog quality of the particular imager, and with the duration of the particular integration period of the sequence for which the reset decision is being made. As a result it is preferable to condition the compare threshold as a function of the specific one of the set of available integration periods for which it is applied and/or to make one or more attributes of the compare threshold settings selectable or programmable as part of the setup instruction to the imager.

The circuit is preferably arranged so that to establish the integration for readout of each pixel, a prescribed sequence of row parallel resets is performed for each row. The first row parallel reset task for a row read sequence is preferably unconditional and the memory associated with each pixel is preferably updated to reflect the initial reset state. Following the first unconditional reset for the prescribed reset sequence which is applied to each row, successive resets of the row are preferably conditional as outlined above. It is preferable that the optical gain for the integration period initiated by each successive row parallel conditional reset task be ratiometrically less than the optical gain for the integration period initiated by the immediately preceding row parallel reset task. The optical gain is normally proportional to integration period so in the exemplary design, the desired ratios will be applied directly to the integration periods.

There are a number of advantages to the novel readout and integration period determining sequence just outlined. First, with the rapid row parallel processing used for the conditional pixel reset, the integration period is actually set for each pixel during the exposure sequence in which the pixel reading is taken. Secondly, the exposure is rather closely bracketed for each pixel and is, for example, adjusted in 4 to 1 increments in the exemplary embodiment so if a 10 bit readout is used, the readings may nominally extend from one quarter of full scale to full scale nominally giving readout resolution of 250 to 1 or better over a very large range of light level. This is ideal and some extra margin may be provided to minimize the likelihood of saturation of the pixels. Even with a very conservative choice of reset threshold, a minimum resolution of, for example 100 to 1 or so may be maintained over the 16,000 to 1 integration range of the exemplary embodiment which would give a light level range of more than 100,000 to 1 over which the resolution of 100 to 1 might be maintained. As a practical matter, the usable range of light level measurement within a given image will often be limited by light scattered in the optical assembly. Nonetheless, this is all possible without any exposure adjustment which often makes it feasible to operate over a relatively large range of ambient light level with no exposure adjustment. This is in stark contrast to a usual sensor having the same 10 bit A/D where the 100 to 1 or better resolution is only available over a 10 to 1 range of light level for any given image. With the integration period selected in multiple steps over a wide range, the full accuracy of the A/D is still realized over the selected integration period which is known and precisely determined so that the dramatically increased measuring range is realized without compromising the readout accuracy of the A/D. In comparison to conventionally acquired images, the noise, banding, and totally blacked out areas in shadowed regions should be dramatically reduced as should saturated highlights. There are some compromises to be made but many possibilities for great improvement for still picture or video camera applications.

Many of the techniques for nondestructive readout do not provide full accuracy for the readout. For example, a pixel is not normally resetable for a nondestructive readout so with these imagers reference readings taken after reset cannot be used to improve readout accuracy for intermediate readings used to determine conditional reset. This implies that decisions to reset a pixel often need to be made based on measurements that may not be of optimal accuracy. An offsetting advantage of the conditional reset over some of the competing techniques is that the decision to reset is one that determines the readout range which is selected and inaccuracies in values on which range selection is based do not directly add to inaccuracies in the reading made using the selected range. For example, if a meter has one volt full scale readout range and a next larger four volt full scale readout range, an input estimated to be 0.8 volts would probably be read using the one volt range if the 0.8 volt estimate was expected to be within 10% of the actual value but would be read using the four volt range if the 0.8 volt estimate was only expected to be within 30% of the actual value. With less accurate estimates, there may be a greater risk of choosing a readout range for which the reading is saturated and it may create a bias toward selection of less accurate larger readout ranges; but in the example the reading may still be expected to have far smaller error than 10% or 30%.

In this last respect, the exemplary system also has inherent advantages over wide dynamic range sensors which use multiple slopes in the response characteristics to increase effective range. First, for these nonlinear devices the nonlinearity for each pixel is normally determined at least in part by components in each pixel so in addition to the difficulty in processing readings taken with a piecewise linear readout, the slopes and breakpoints are not likely to match well because of mismatches in pixel level characteristics of the breakpoint and slope determining mechanism. Secondly, since the slope changes are normally applied in the analog domain, the entire value must be read by the A/D with further loss in readout accuracy for an A/D of a given resolution. Third, the piecewise linear scaling of data is not friendly to processing because in addition to the problems with readout accuracy caused by the factors above, the piecewise linear format requires somewhat calculation intensive processing to convert it to a more calculation friendly form such as linear or perhaps logarithmic.

The advantage of maintaining readout resolution over a vastly greater range in light level due to the multiple per pixel integration ranges was noted above. There are many ways to utilize this advantage in balancing the features of a design. The added memory requirement to record an indication of the per pixel integration period setting requires more silicon area for larger feature size silicon wafer fabrication processes than for smaller feature size processes; but, smaller feature size silicon processes operate at lower voltages placing added limits on the dynamic range available from the pixel. In many applications utilizing imagers with single integration periods for a given image, higher dynamic range is used primarily to achieve adequate resolution over a greater range in light level. With the integration period selected on a pixel by pixel basis using the imager of this invention which maintains good resolution over a very wide dynamic range even within a single image, peak dynamic range may often be lowered in exchange for the extended dynamic range provided by the multiple integration period acquisition taking place within individual images.

In the exemplary embodiment, the row parallel reset process to select the integration period for each pixel in the sensing array is applied in a sequence which for any given row is begun by an unconditional parallel reset of pixels in the row to begin the longest attainable integration period for reading (given the imager settings) each pixel of the row. Then just before ¾ of the integration period has elapsed, a conditional reset of each pixel in the row as described above is done to conditionally reset pixels which are saturated or too likely to saturate with the current integration period setting. This process is repeated six more times with each succeeding integration period to which pixels are conditionally set sized to make the readout sensitivity one quarter of what it was for the immediately previous range. The result for the exemplary design is that the integration period may range in 4 to 1 increments from approximately 32,768 microseconds for the longest selectable integration period to 2 microseconds for the shortest selectable integration yielding a ratio of 16,384 to 1 between the longest and shortest of the integration periods which are automatically and individually set for each pixel in the frame for the exemplary design. The timing cadence for the reset and read process is preferably based on the column by column incremental scan through the column scan counts corresponding to each pixel of a scan row. The completion of an incremental scan through the column count or column address values for a given row count then preferably results in the incremental advance of the row scan count to the next scan row until all of the rows in the image scan frame have been covered at which point the image acquisition may halt or advance to another column and row scan sequence. In general, the time interval between two pixel locations in the pixel/row scan frame is expressed as the number of incremental pixel times to advance from the (column, row) location of the first pixel to the (column, row) location of the second pixel. The incremental pixel times between the starting and ending pixel locations may be expressed in terms of an incremental column offset which may be defined as the column address of the second pixel minus the column address of the starting pixel. This is a negative number when the column address of the starting pixel is greater than the column address of the ending pixel and non-negative otherwise. The row offset may be defined as the incremental row offset required to increment from the row containing the starting pixel to the row which contains the ending pixel. In the exemplary design the row read is done at a prescribed column time and each of the eight respective integration periods are initiated at a column time associated with the respective integration period such that the time interval between the point at which the reset is just completed to the point at which the row is read is nearly equal to the intended integration time. In the exemplary design, the number of columns and rows in the scan frame were selected with 626 columns by 420 rows and with a pixel scan rate of 8 pixels per microsecond. With this combination of numbers of rows, columns, and pixel times; integration times and available number of integration rows may be, and are chosen so that the row read task and each of the 8 pixel reset tasks for the 8 available integration time periods occur over ranges of row column time intervals which are non-overlapping. In this way, the row select circuit, the array readout column lines, the row of column parallel reset logic, and reset history memory access may be shared without conflict between the 8 reset tasks or the row read task. Each of the eight integration time specific row reset or conditional row reset tasks and the row read are preferably initiated at specified column counts. This will be covered in more depth elsewhere herein. In general, in the exemplary embodiment, the row length etc. are chosen so that the row read and each of the eight reset tasks, each to initiate an integration period of a specific duration, fall on specific non-overlapping column time intervals. A specified column count value is preferably used to initiate each of the sequences and is preferably pre-selected so that adherence to the timing provides the proper column offset to create the proper interval for each of the integration periods. In the preferred configuration, readout is preferably performed on the row pointed to by the row counter, possibly modified by a row offset value preferably used for providing an origin for the readout window. Then for each of the rows selected for a row reset or conditional row reset task, an additional integration period specific row offset value which corresponds to the integration period for which the reset or conditional reset is being made is added to the row count, preferably using modulo arithmetic, to select the row to which to apply the reset task. This added integration period specific row offset is used to set the row time interval between the reset task and the row read task for the row to which the current reset task is applied.

For a wide dynamic range sensor, it is desirable to automatically select an integration time period over a range of as much as, for example, 16,000 to 1 or more. For such a sensor the integration period might, for example, range from about 32 ms to about 2 µs. It is further preferable that exposure for pixels in a row take place at nearly the same time. One way that this might be stated is that the exposure periods of pixels within a row share at least one common instant in time.

It is further desirable to choose the integration periods so that the pixel values taken with differing integration periods are easy to reconcile into a single, common, wide-ranging numerical format. Since pixel values are normally expressed in either linear or logarithmically weighted binary form, it is desirable to select successive integration periods so that the ratio of the sensitivity of the imager from any one integration period to the sensitivity of the imager at the next shorter integration period is approximately equal to an integral power of two. The optical gain or sensitivity is the more desirable attribute on which to base this ratio. However, the optical sensitivity of most imagers varies nearly in direct proportion to the integration period. Thus, in the exemplary design, the ratios of the integration periods are chosen so that they are an integral power of two from one to the next. It should be understood that if there is a systematic nonlinearity in the optical sensitivity of the sensor versus integration period; then, it is preferable to adjust the integration periods so the optical gains from one range to the next lower range are in a ratio which is approximately equal to an integral power of two. It should further be understood that even though this is a good choice for many applications of this invention, the invention is not restricted to selecting successive gain ranges as specified above. Additionally, small percentage adjustments to the period of one or more of the longer integration periods may be made to eliminate some conflicts in the use of shared components with only a small loss in system accuracy.

As indicated above, even with the row parallel reset tasks (both conditional and unconditional), organization is required to provide time to interleave all of the reset and row read tasks to be performed without conflicting requirements for use of shared components such as the row select circuit, the column readout lines, the reset memory record access, and the conditional reset comparators and associated logic. The exemplary embodiment already referred to above is used in FIGS. 1 through 3 to illustrate how the sequence may be organized in a non-conflicting way. In the exemplary design, a normal rolling shutter sequence is used to progress through the reset, integration, and readout sequence. The scan is a repeating sequence which cycles from column 0 through column 625 for each row and at the completion of each column cycle it advances to the next row from row 0 through row 419 and back to row 0 etc. for as many image frames as are to be acquired in the readout sequence. As with traditional rolling shutter operation for which provision is made to read only one or a few frames, perhaps with the option to also read continuously, the first scan, or possibly partial scan through the image frame is normally used to initialize integration periods with readout of rows being suppressed until an integration period has been provided for the row. This implies an initial frame (or partial frame) is needed to perform the first reset tasks so that to readout n frames, n frames plus the portion of the frame needed for the initial reset are needed for the readout sequence. For some applications, interest may be primarily to read images in a continuous mode in which case suppression of readout of the startup frame may not be necessary. For these applications as with acquisition of succeeding frames after the first, integration is interleaved with readout so that the frame repetition time needs to be only slightly longer than the longest integration time provided for a pixel. For designs used only for acquiring a discrete number of frames, synchronization may be established by counting pixels. For imagers designed for continuous or long sequences of frame acquisition or even to add robustness when only one or a few frames are acquired, a readout format which includes signaling to establish row and frame synchronization is desirable.

Figure 2:
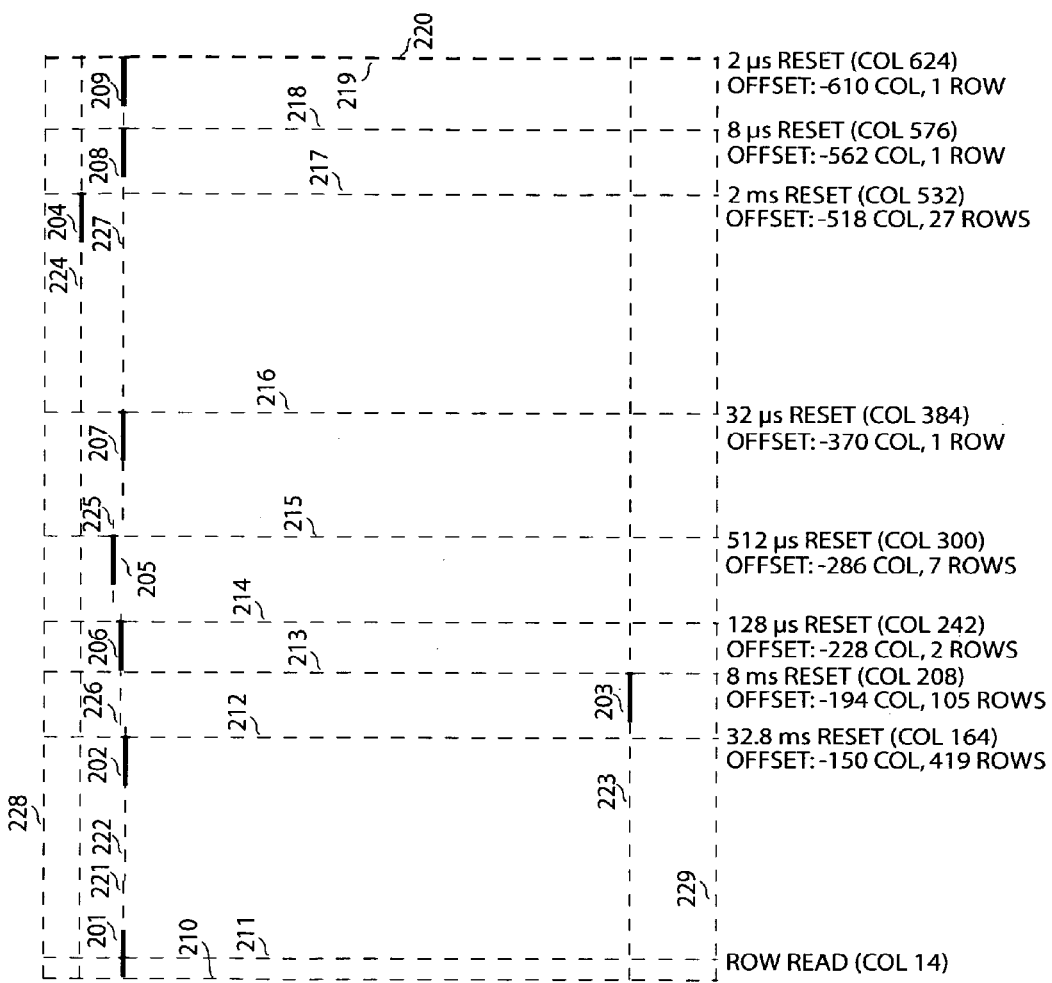
Figure 3:
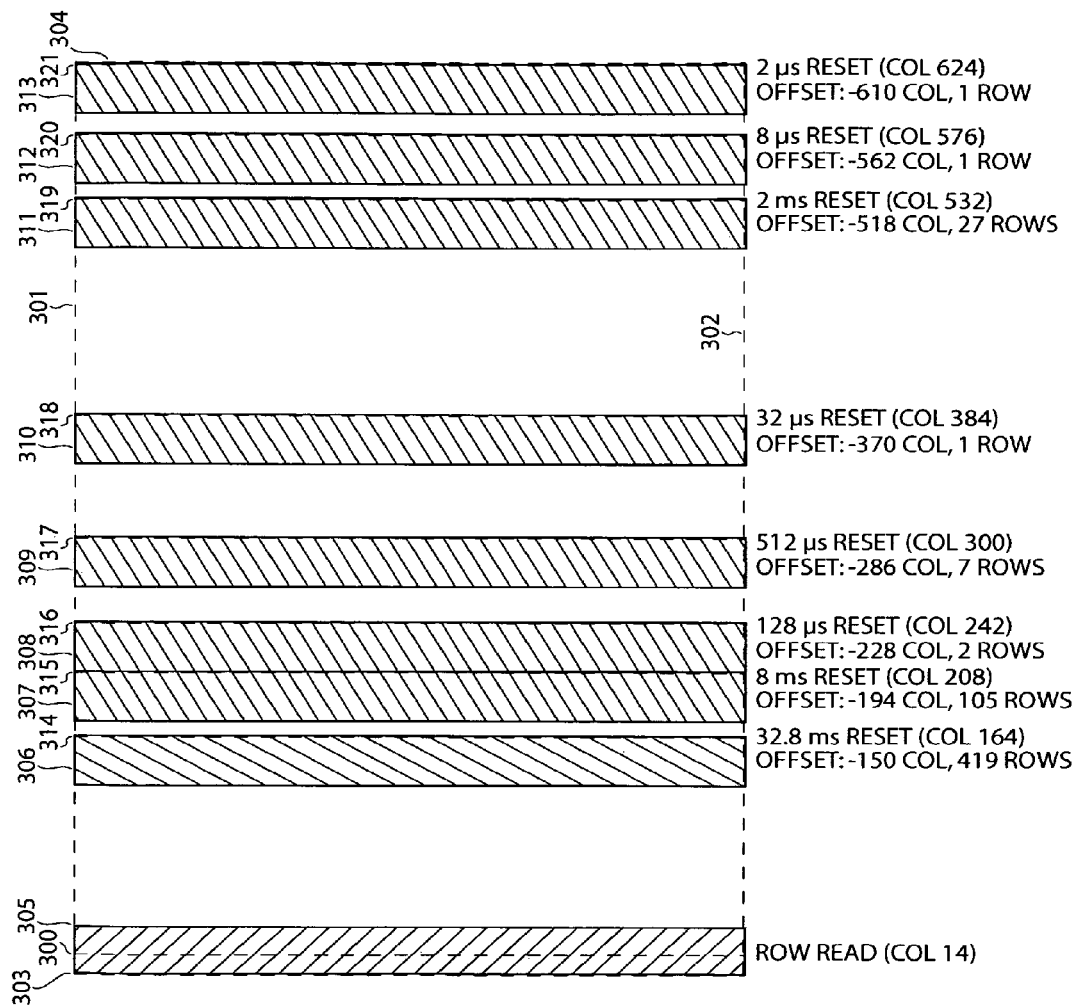
FIG. 3 depicts a timing sequence.

With reference to FIG. 1, the reset sequence for reset of pixels in row 0 is illustrated for a high dynamic range image taken by an imager of the exemplary design using 420 scan rows by 626 scan columns. The term scan is used here to refer to the rows and columns sequenced through in the scan sequence. Not every value sequenced through needs to be used to access an active row or column and in general it is only necessary to have enough rows and columns in the scan sequence to access rows and columns which are actually read in an appropriate sequence and perhaps enough additional scan rows and/or columns to provide for the multiple integration periods of the high dynamic range sensor with a non-overlapping or non-conflicting schedule of tasks for the read and the reset tasks. The actual imaging array may have fewer rows and/or columns (or in some cases more rows and/or columns) than are cycled through in the scan sequence. In FIGS. 1 through 3, use of the scan sequence to generate the time base for the reset and read sequence is illustrated. In FIG. 1 only the initiation of reset or conditional reset tasks which apply to pixels in row 0 are illustrated. The exemplary design includes a high dynamic range scan sequence for which the column and row count progresses through successive column counts for each row with 626 columns (column 0 through 625) provided and through rows of a frame having 420 rows (row 0 through 419). The sequence is to index from column 0 through 625 for each row, to index to the next row when cycling from column 625 to column 0 and to cycle from row 419 to row 0. The sequence is repeated until the desired number of frames has been read. In the exemplary design, the column count is indexed at a rate of 8 million counts per second so the frame of 262,920 pixels is sequenced through in 32.865 milliseconds providing a frame rate of just over 30 frames per second.

The row read sequence for row 0 (101) is initiated at column 1 of row 0 (121) and the effective readout takes place at column 14. This readout is preferably suppressed during the scan through the initial frame so that the reset sequence may be initiated during this frame and is preferably performed for all of the succeeding frames included in the readout sequence. For example, when only one frame is read, two scan frames are provided, the first to begin initiation of the integration periods and the second to commence readout and continue handling of resets and conditional resets to provide the proper reset sequence for each pixel of each row which is read.

The 32.768 ms unconditional reset sequence (102) for row 0 (121) is initiated at column 132 of row 1 (122). The row to be reset is calculated by adding the row offset of 419 for the 32.768 millisecond integration period to row 1 in which the reset is performed yielding 420 modulo 420 which is 0 so row 0 is reset in the sequence (102). The reset is released and the integration period begins at column 164 (112) so the column offset from the start of integration, column 164, to the row read, column 14, is:

14−164=−150.

The time from the release of the reset to the read is the row offset multiplied by the number of pixels per scan row plus the signed column offset between pixels at the start and end of the integration period this quantity divided by the scan rate.

(419*626−150)/8=32.768 milliseconds.

One option to provide a standard dynamic range mode is to inhibit some or all of the succeeding conditional resets after the initial one which was just described and to provide flexibility to program the row and column offsets and the integration time with the associated row and column offsets to give wide ranging options in setting of the integration period. The image control may provide flexibility to adjust the frame sizes for both the scan frame and the sub-frame over which image data is read.

The 8.192 ms pixel by pixel conditional reset sequence (103) for row 0 (121) is initiated at column 176 of row 315 (123). The row to be reset is calculated by adding the row offset of 105 for the 8.192 millisecond integration period to row 315 in which the reset is performed yielding 420 modulo 420 which is 0 so row 0 is reset in the sequence 103. The reset is released and the integration period begins at column 208 (113) so the column offset from the start of integration, column 208, to the row read, column 14, is:

14−208=−194.

The time from the release of the reset to the read is the row offset multiplied by the number of pixels per scan row plus the signed column offset between pixels at the start and end of the integration period this quantity divided by the scan rate.

(176*626−194)/8=8.192 milliseconds.

The 2.048 ms pixel by pixel conditional reset sequence (104) for row 0 (121) is initiated at column 500 of row 393 (124). The row to be reset is calculated by adding the row offset of 27 for the 2.048 millisecond integration period to row 393 in which the reset is performed yielding 420 modulo 420 which is 0 so row 0 is reset in the sequence 104. The reset is released and the integration period begins at column 532 (117) so the column offset from the start of integration, column 208, to the row read, column 14, is:

14−532=−518.

The time from the release of the reset to the read is the row offset multiplied by the number of pixels per scan row plus the signed column offset between pixels at the start and end of the integration period this quantity divided by the scan rate.

(27*626−518)/8=2.048 milliseconds.

The 512 μs pixel by pixel conditional reset sequence (105) for row 0 (121) is initiated at column 268 of row 413 (125). The row to be reset is calculated by adding the row offset of 7 for the 512 microsecond integration period to row 413 in which the reset is performed yielding 420 modulo 420 which is 0 so row 0 is reset in the sequence 105. The reset is released and the integration period begins at column 300 (115) so the column offset from the start of integration, column 300, to the row read, column 14, is:

14−300=−286.

The time from the release of the reset to the read is the row offset multiplied by the number of pixels per scan row plus the signed column offset between pixels at the start and end of the integration period this quantity divided by the scan rate.

(7*626−286)/8=512 microseconds.

The 128 μs pixel by pixel conditional reset sequence (106) for row 0 (121) is initiated at column 210 of row 418 (126). The row to be reset is calculated by adding the row offset of 2 for the 128 microsecond integration period to row 418 in which the reset is performed yielding 420 modulo 420 which is 0 so row 0 is reset in the sequence 106. The reset is released and the integration period begins at column 242 (114) so the column offset from the start of integration, column 242, to the row read, column 14, is:

14−242=−228.

The time from the release of the reset to the read is the row offset multiplied by the number of pixels per scan row plus the signed column offset between pixels at the start and end of the integration period this quantity divided by the scan rate.

(2*626−228)/8=128 microseconds.

The 32 μs pixel by pixel conditional reset sequence (107) for row 0 (121) is initiated at column 352 of row 419 (127). The row to be reset is calculated by adding the row offset of 1 for the 32 microsecond integration period to row 419 in which the reset is performed yielding 420 modulo 420 which is 0 so row 0 is reset in the sequence 107. The reset is released and the integration period begins at column 384 (116) so the column offset from the start of integration, column 384, to the row read, column 14, is:

14−384=−370.

The time from the release of the reset to the read is the row offset multiplied by the number of pixels per scan row plus the signed column offset between pixels at the start and end of the integration period this quantity divided by the scan rate.

(1*626−370)/8=32 microseconds.

The 8 μs pixel by pixel conditional reset sequence (108) for row 0 (121) is initiated at column 544 of row 419 (127). The row to be reset is calculated by adding the row offset of 1 for the 8 microsecond integration period to row 419 in which the reset is performed yielding 420 modulo 420 which is 0 so row 0 is reset in the sequence 108. The reset is released and the integration period begins at column 576 (118) so the column offset from the start of integration, column 576, to the row read, column 14, is:

14−576=−562.

The time from the release of the reset to the read is the row offset multiplied by the number of pixels per scan row plus the signed column offset between pixels at the start and end of the integration period this quantity divided by the scan rate.

(1*626−562)/8=8 microseconds.

The 2 μs pixel by pixel conditional reset sequence (109) for row 0 (121) is initiated at column 592 of row 419 (127). The row to be reset is calculated by adding the row offset of 1 for the 2 microsecond integration period to row 419 in which the reset is performed yielding 420 modulo 420 which is 0 so row 0 is reset in the sequence 109. The reset is released and the integration period begins at column 624 (119) so the column offset from the start of integration, column 624, to the row read, column 14, is:

14−624=−610.

The time from the release of the reset to the read is the row offset multiplied by the number of pixels per scan row plus the signed column offset between pixels at the start and end of the integration period this quantity divided by the scan rate.

(1*626−610)/8=2 microseconds.

Sequences similar to that of FIG. 1 which details the reset and read sequence for row 0 are performed for each of the remaining 419 rows in the imaging scan frame. In FIG. 2 the reset sequence for reset of pixels in row 50 is illustrated using the same imaging array described in FIG. 1. In FIG. 2 only the initiation of reset or conditional reset tasks which apply to pixels in row 50 are illustrated.

The row read sequence for row 50 (201) is initiated at column 1 of row 50 (221) and the effective readout takes place at column 14. This readout is preferably suppressed during the scan through the initial frame so that the reset sequence may be initiated during this frame and is preferably performed for all of the succeeding frames included in the readout sequence. For example, when only one frame is read, two scan frames are provided, the first to begin initiation of the integration periods and the second to commence readout and continue handling of resets and conditional resets to provide the proper reset sequence for each pixel of each row which is read.

The 32.768 ms unconditional reset sequence (202) for row 50 (221) is initiated at column 132 of row 51 (222). The row to be reset is calculated by adding the row offset of 419 for the 32.768 millisecond integration period to row 51 in which the reset is performed yielding 470 modulo 420 which is 50 so row 50 is reset in the sequence (202). The reset is released and the integration period begins at column 164 (212) so the column offset from the start of integration, column 164, to the row read, column 14, is:

14−164=−150.

The time from the release of the reset to the read is the row offset multiplied by the number of pixels per scan row plus the signed column offset between pixels at the start and end of the integration period this quantity divided by the scan rate.

(419*626−150)/8=32.768 milliseconds.

The 8.192 ms pixel by pixel conditional reset sequence (203) for row 50 (221) is initiated at column 176 of row 365 (223). The row to be reset is calculated by adding the row offset of 105 for the 8.192 millisecond integration period to row 365 in which the reset is performed yielding 470 modulo 420 which is 50 so row 50 is reset in the sequence 203. The reset is released and the integration period begins at column 208 (213) so the column offset from the start of integration, column 208, to the row read, column 14, is:

14−208=−194.

The time from the release of the reset to the read is the row offset multiplied by the number of pixels per scan row plus the signed column offset between pixels at the start and end of the integration period this quantity divided by the scan rate.

(176*626−194)/8=8.192 milliseconds.

The 2.048 ms pixel by pixel conditional reset sequence (204) for row 50 (221) is initiated at column 500 of row 23 (224). The row to be reset is calculated by adding the row offset of 27 for the 2.048 millisecond integration period to row 50 in which the reset is performed yielding 50 modulo 420 which is 50 so row 50 is reset in the sequence 204. The reset is released and the integration period begins at column 532 (217) so the column offset from the start of integration, column 208, to the row read, column 14, is:

14−532=−518.

The time from the release of the reset to the read is the row offset multiplied by the number of pixels per scan row plus the signed column offset between pixels at the start and end of the integration period this quantity divided by the scan rate:

(27*626−518)/8=2.048 milliseconds.

The 512 μs pixel by pixel conditional reset sequence (205) for row 50 (221) is initiated at column 268 of row 43 (225). The row to be reset is calculated by adding the row offset of 7 for the 512 microsecond integration period to row 43 in which the reset is performed yielding 50 modulo 420 which is 50 so row 50 is reset in the sequence 205. The reset is released and the integration period begins at column 300 (215) so the column offset from the start of integration, column 300, to the row read, column 14, is:

14−300=−286.

The time from the release of the reset to the read is the row offset multiplied by the number of pixels per scan row plus the signed column offset between pixels at the start and end of the integration period this quantity divided by the scan rate.

(7*626−286)/8=512 microseconds.

The 128 μs pixel by pixel conditional reset sequence (206) for row 50 (221) is initiated at column 210 of row 48 (226). The row to be reset is calculated by adding the row offset of 2 for the 128 microsecond integration period to row 48 in which the reset is performed yielding 50 modulo 420 which is 50 so row 50 is reset in the sequence 206. The reset is released and the integration period begins at column 242 (214) so the column offset from the start of integration, column 242, to the row read, column 14, is:

14−242=−228.

The time from the release of the reset to the read is the row offset multiplied by the number of pixels per scan row plus the signed column offset between pixels at the start and end of the integration period this quantity divided by the scan rate.

(2*626−228)/8=128 microseconds.

The 32 μs pixel by pixel conditional reset sequence (207) for row 50 (221) is initiated at column 352 of row 49 (227). The row to be reset is calculated by adding the row offset of 1 for the 32 microsecond integration period to row 49 in which the reset is performed yielding 50 modulo 420 which is 50 so row 50 is reset in the sequence 207. The reset is released and the integration period begins at column 384 (216) so the column offset from the start of integration, column 384, to the row read, column 14, is:

14−384=−370.

The time from the release of the reset to the read is the row offset multiplied by the number of pixels per scan row plus the signed column offset between pixels at the start and end of the integration period this quantity divided by the scan rate.

(1*626−370)/8=32 microseconds.

The 8 μs pixel by pixel conditional reset sequence (208) for row 50 (221) is initiated at column 544 of row 49 (227). The row to be reset is calculated by adding the row offset of 1 for the 8 microsecond integration period to row 49 in which the reset is performed yielding 50 modulo 420 which is 50 so row 50 is reset in the sequence 208. The reset is released and the integration period begins at column 576 (218) so the column offset from the start of integration, column 576, to the row read, column 14, is:

14−576=−562.

The time from the release of the reset to the read is the row offset multiplied by the number of pixels per scan row plus the signed column offset between pixels at the start and end of the integration period this quantity divided by the scan rate.

(1*626−562)/8=8 microseconds.

The 2 μs pixel by pixel conditional reset sequence (209) for row 50 (221) is initiated at column 592 of row 49 (227). The row to be reset is calculated by adding the row offset of 1 for the 2 microsecond integration period to row 49 in which the reset is performed yielding 50 modulo 420 which is 50 so row 50 is reset in the sequence 209. The reset is released and the integration period begins at column 624 (219) so the column offset from the start of integration, column 624, to the row read, column 14, is:

14−624=−610.

The time from the release of the reset to the read is the row offset multiplied by the number of pixels per scan row plus the signed column offset between pixels at the start and end of the integration period this quantity divided by the scan rate.

(1*626−610)/8=2 microseconds.

FIGS. 1 and 2 in combination illustrate the pattern for the reset and row read schedule which is chosen. Row 50 comes 50 rows after row 0. Expressed using modulo arithmetic where the row number is expressed as the smallest non-negative integer modulo the number of rows in the scan frame, the reset and row read tasks in FIG. 2 all occur 50 rows after the corresponding row read or reset tasks for row 0. This same correspondence holds for any pair of rows in the imaging array. That is, for any pair of rows in the imaging array, there is a constant row offset (using modulo arithmetic) between intervals over which corresponding tasks are performed for the individual rows of the pair. FIG. 3 illustrates the implication of this property when combined with the property that the row read and each of the row reset tasks are performed over ranges of incremental column count values or column times which are mutually non-conflicting and which are predetermined for a particular high dynamic range imager reading sequence. In the exemplary design, this property is satisfied by the stronger restriction for a particular high dynamic range reading sequence that the processing intervals for each row read and integration time related reset task are related to column time intervals which are preferably pre-selected for the reading sequence and which are arranged to occur over non-overlapping ranges of column timing values. Furthermore, the column intervals are preferably applied uniformly to the sequencing of the row read and reset tasks for each row of the imager which is read in the particular image reading sequence. In the preferred design, the column range over which the row read is done for each row is preferably pre-selected for a particular read task. Then, the column count range for which a reset task associated with a particular integration period is performed is preferably selected to provide the desired column offset which is associated with the particular integration period and the row offset is preferably selected to provide the desired row offset which is associated with the particular integration period. The column, and row offsets in combination with the timing cadence of the scan sequence then preferably provide the desired integration period. For the purposes stated here where the processing is preferably at least partially row parallel, the column count serves to provide row by row timing and also serves as a time base for processing which is synchronized with row sequencing tasks. As an option, this timing does not have to be directly related to the number or columns of pixels in a row. Relating the column count to actual columns of pixels is only a convenience since the time base may then be conveniently used to sequence pixel A/D conversion, and pixel format processing and readout tasks which are usually directly related to pixel by pixel sequencing through the image frame.

With reference to FIG. 3, the scan frame extends from column 0 at 303 through column 625 at 304 and from row 0 at 301 through row 419 at 302. In some embodiments, general row or column offsets may be added to the row and/or column counts referenced here to effectively adjust the origin of the imaging frame. This option is considered to be part of the invention but, to simplify the description, it will not be included in the description of FIG. 3.

The row readout for each row is applied to the row which is addressed and is performed during the interval extending from column 1 through column 34 represented by bar 305. The effective readout takes place at the beginning of column period 14 (300).

The 32.768 millisecond row reset for each row is applied to the row whose address is computed by adding 419 (the row offset for the 32.768 millisecond integration period) to the row address modulo 420 (the number of rows in the imager scan frame). The reset takes place over the column interval extending from column 132 through column 165 represented by bar 306. The reset is released so that the integration period begins at the beginning of column period 164 (314). This provides the desired column offset of −150 columns to the row read task at column 14 for the 32.768 millisecond integration period.

The 8.192 millisecond pixel level conditional row reset for each row is applied to the row whose address is computed by adding 105 (the row offset for the 8.192 millisecond integration period) to the row address modulo 420 (the number of rows in the imager scan frame). The reset takes place over the column interval extending from column 176 through column 209 represented by bar 307. The reset is released so that the integration period begins at the beginning of column period 208 (315). This provides the desired column offset of −194 columns to the row read task at column 14 for the 8.192 millisecond integration period.

The 2.048 millisecond pixel level conditional row reset for each row is applied to the row whose address is computed by adding 27 (the row offset for the 2.048 millisecond integration period) to the row address modulo 420 (the number of rows in the imager scan frame). The reset takes place over the column interval extending from column 500 through column 533 represented by bar 311. The reset is released so that the integration period begins at the beginning of column period 532 (319). This provides the desired column offset of −518 columns to the row read task at column 14 for the 2.048 millisecond integration period.

The 512 microsecond pixel level conditional row reset for each row is applied to the row whose address is computed by adding 7 (the row offset for the 512 microsecond integration period) to the row address modulo 420 (the number of rows in the imager scan frame). The reset takes place over the column interval extending from column 268 through column 301 represented by bar 309. The reset is released so that the integration period begins at the beginning of column period 300 (317). This provides the desired column offset of −286 columns to the row read task at column 14 for the 512 microsecond integration period.

The 128 microsecond pixel level conditional row reset for each row is applied to the row whose address is computed by adding 2 (the row offset for the 128 microsecond integration period) to the row address modulo 420 (the number of rows in the imager scan frame). The reset takes place over the column interval extending from column 210 through column 243 represented by bar 308. The reset is released so that the integration period begins at the beginning of column period 242 (316). This provides the desired column offset of −228 columns to the row read task at column 14 for the 128 microsecond integration period.

The 32 microsecond pixel level conditional row reset for each row is applied to the row whose address is computed by adding 1 (the row offset for the 32 microsecond integration period) to the row address modulo 420 (the number of rows in the imager scan frame). The reset takes place over the column interval extending from column 352 through column 385 represented by bar 310. The reset is released so that the integration period begins at the beginning of column period 384 (318). This provides the desired column offset of −370 columns to the row read task at column 14 for the 32 microsecond integration period.

The 8 microsecond pixel level conditional row reset for each row is applied to the row whose address is computed by adding 1 (the row offset for the 8 microsecond integration period) to the row address modulo 420 (the number of rows in the imager scan frame). The reset takes place over the column interval extending from column 544 through column 577 represented by bar 312. The reset is released so that the integration period begins at the beginning of column period 576 (320). This provides the desired column offset of −562 columns to the row read task at column 14 for the 8 microsecond integration period.

The 2 microsecond pixel level conditional row reset for each row is applied to the row whose address is computed by adding 1 (the row offset for the 2 microsecond integration period) to the row address modulo 420 (the number of rows in the imager scan frame). The reset takes place over the column interval extending from column 592 through column 625 represented by bar 313. The reset is released so that the integration period begins at the beginning of column period 624 (321). This provides the desired column offset of −610 columns to the row read task at column 14 for the 2 microsecond integration period.

For the shaded areas in FIG. 3 which cover approximately half of the total area relatively processing intensive at least partially row parallel tasks are being performed. This indicates that in the exemplary embodiment, exposure control processing has been distributed so that at least partially row parallel tasks related to exposure control and image acquisition share row parallel processing components, row select and column readout select logic, row column cross-point pixel selectable reset logic, and integration period setting memory access without conflict and the tasks are active approximately 50% of the time during image acquisition. By partitioning the integration period specific reset tasks and the row read task so that for each associated integration period they take place during pre-selected column times which are generally non-overlapping with the column times which are associated with other integration periods and by providing an appropriate row offset for each of the integration period specific reset tasks, the same row offset is applied for all of the resets for the same integration period which are made in a given range of column times so that each reset task still has its own row with its own non-conflicting time slot in the dedicated column range within the row in which it may be performed.

Figure 4:
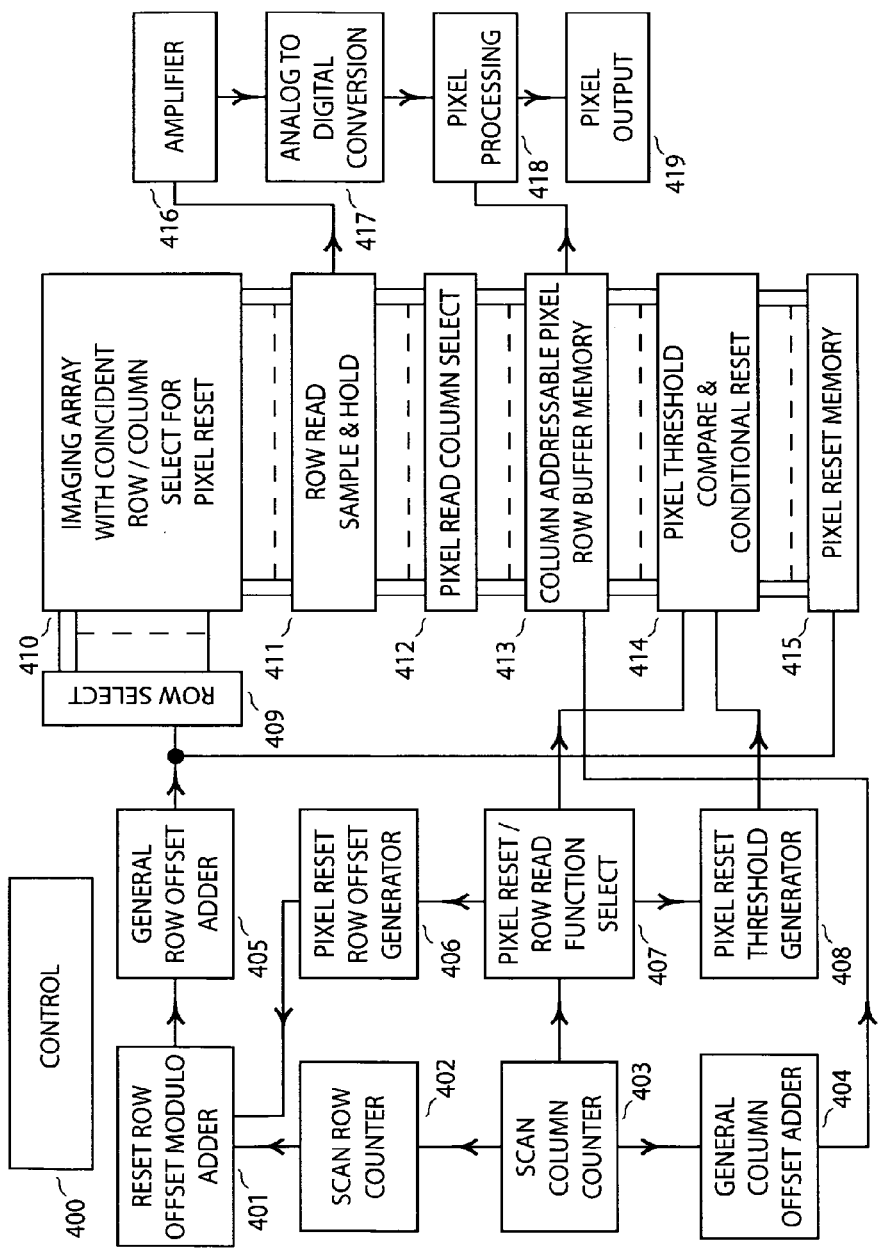
FIG. 4 depicts a block diagram of an exemplary design.

FIG. 4 depicts a block diagram of an exemplary design of a high dynamic range imaging device. The imaging device is preferably based on a conventional rolling shutter CMOS design which is enhanced to include the dynamic range improvements capability of the present invention. The diagram is simplified, particularly with respect to features which carry over from the conventional rolling shutter design. Diagram blocks 410 through 415 all operate in one way or another on signals related to columns of pixels in the imager. Thus, it is assumed that the column related signals may be routed through some of the blocks without necessarily being used in each block and that each block has access to the appropriate column related signals. Integration and row read timing is based on a scan column counter 403 which in the exemplary design counts incrementally from zero through its highest value (625 in the exemplary design), goes to zero on the next count, again counts incrementally from zero to highest value and so on. Each time that the scan column count cycles back to zero the scan row counter is incremented to its next value. In the exemplary design, the scan row count 402 begins at count zero, counts up incrementally through its highest value (419 in the exemplary design), goes back to zero on the next count, counts up incrementally through its highest value, and so on.

In order to accommodate automatic selection of one of the possible integration periods (eight total in the exemplary design), the pixels of a row are preferably all reset at the beginning of the longest of the integration periods and then each pixel and its associated reset record are interrogated just prior to the beginning of each of the succeeding shorter integration periods and each pixel of the row is conditionally reset based on the comparison of the current pixel value against a threshold value and the reset history for the pixel.

Whenever a pixel is not reset, it is preferably not reset again prior to readout but is allowed to integrate to complete the integration period initiated by its most recent prior reset. Whenever a pixel is reset (preferably including the initial unconditional reset), the memory associated with the pixel (3 bits per pixel are all that are required to identify the one of 8 possible selectable reset states) is updated to indicate the integration period for which it is being reset. Preferably the memory value for a pixel is not changed during a conditional reset task for which the pixel is not reset. At the end of the integration period, the value associated with the pixel indicates which of the integration periods was used for the reading. This information is preferably read out in a synchronized manner with the readout and A/D conversion of the pixels in the row and is preferably used to properly scale the final readout value. In the preferred design, the integration periods in a row are preferably initiated so that they all end simultaneously, that is so that the row read which ends the integration period may be done simultaneously for all pixels of the row regardless of the actual integration period for each pixel. At the end of the integration period, the row is read, preferably by a sequence which transfers pixel values in the selected row to a row of sampling capacitors and preferably also transfers the reset voltages to a second row of sampling capacitors and digitizes the values and adjusts them to reflect the record of the integration period used. This value is typically output from the imager.

In the block diagram of FIG. 4, the scan row counter 402, the scan column counter 403, the general column offset adder 404, the general row offset adder 405, the row select 409, the row read sample and hold 411, the amplifier 416, and the analog to digital conversion 417 may be similar to those used in conventional prior art imaging arrays. With all of these features retained from prior art imagers, it is reasonably straight forward to provide the flexibility in an implementation of the imager of this invention to provide an option to operate in a standard dynamic range mode in addition to being able to operate in one or more high dynamic range modes. A control circuit 400 receives instructions communicated to the imager and controls the instruction sequence described below.

To acquire a high dynamic range image, the scan column counter 403 cycles through the column range for each row and the scan row counter 402 is incremented for each new row as indicated by completion of a cycle through the column counts by scan column counter 403. The pixel reset and row read function select circuit 407 decodes column count ranges and generates signals to initiate and control the row read and the various reset functions. The pixel reset threshold generator 408 generates a threshold value which is optionally dependent on the particular integration period initiated by the active reset task. This threshold value is compared against signals which indicate the integrated charge level for each pixel of the selected row to make partial determination on whether or not to reset each pixel of the row. This determination is preferably made on a pixel by pixel basis. Pixel reset row offset generator 406 receives a signal from the pixel reset row read function select circuit 407 which indicates which of the row read or reset tasks, if any, is active and, for the row reset tasks, generates a row offset appropriate to the duration of the integration period to be initiated by the reset. The reset row offset modulo adder 401 adds the offset value appropriate to the duration of the integration period associated with the reset being processed to the row address, preferably using modulo arithmetic to keep the generated row address in a range to appropriately cycle from the bottom back to the top of the scan frame.

General row and column offsets are optionally added to the row and column values in blocks 404 and 405 to provide added flexibility to control the origin of the image frame in the imaging array 410. The row select circuit 409 decodes the row select address and gates control signals used for row processing to the selected row. The imaging array 410 includes an individual pixel reset capability which is preferably implemented by providing a feature within each pixel whereby reset is accomplished by the coincident assertion of a row and column signal for each pixel which is to be reset. In use, to selectively reset pixels of a row, the row reset for the selected row is asserted and column reset lines are asserted only for pixels of the row selected for reset. The row read sample and hold circuit 411 preferably includes sampling capacitors to sample analog values for each column of pixels in the imager. This circuit is similar to ones normally employed and preferably includes sequential sampling of both the readout values and of the reset reference levels on each of the column readout lines. The circuit also has provision to respond to signals from the column select circuit 412 and to gate analog values for the selected column to output amplifier 416. The amplified and preferably offset corrected value from amplifier 416 is converted to digital form by analog to digital converter 417. A pixel processing circuit 418 conditions the digital value from analog to digital converter 417 combining it with the memory indication of the integration period used to take the reading obtained from column addressable pixel row buffer memory 413 so that the output value is scaled to properly indicate the light level received by the pixel taking into account the integration period used to take the reading as indicated by the value stored in memory. For this operation, the pixel read column select circuit 412 preferably selects corresponding values from the row read sample and hold circuit 411 and the column addressable pixel row buffer memory 413. When a pipelined analog to digital conversion circuit is used, a corresponding pipeline or appropriate offset in the addressing scheme is incorporated so that pixel processing circuit 418 combines digitized readings with the corresponding indication of the integration period used for the pixel. The column addressable pixel row buffer memory preferably accesses pixel reset memory 415 during the row read task and buffers the reset information for the row being read in memory register 413. In the exemplary design, the pixel reset memory 415 preferably contains three bits per pixel. The memory is preferably organized so that the same signal used for the row select, optionally before application of the general row offset, is used to address the memory. Preferably the three bits per pixel are available in parallel for each pixel, or pixel related column, of the selected row. This access preferably includes read and write capability. The pixel threshold compare and conditional reset block 414 has access to the pixel reset threshold from the pixel reset threshold generator output from block 408, the column lines which are driven with signals which indicate the level of integrated charge on each pixel of the selected row of the array from imaging array 410, read and write access to the addressed column related word of the pixel reset memory 415, the column reset lines to imaging array 410, and controlling signals from the pixel reset and row read function select block 407. It is this block that preferably contains logic to perform parallel tasks for significant portions of the row being processed and which in response to control signals operates on the indication of integrated light induced charge in combination with the pixel reset memory entry for each pixel of the selected row (or a significant portion of the pixels in the row) to make a determination as to whether or not to reset each or a significant number of the active pixels of the row. The circuit selectively outputs the column reset signals to selectively reset pixels of the row and updates the reset memory for pixels of the row as required. This update preferably includes writing an indication of the duration of the new integration period which is established for pixels which are selectively reset.

Figure 5:
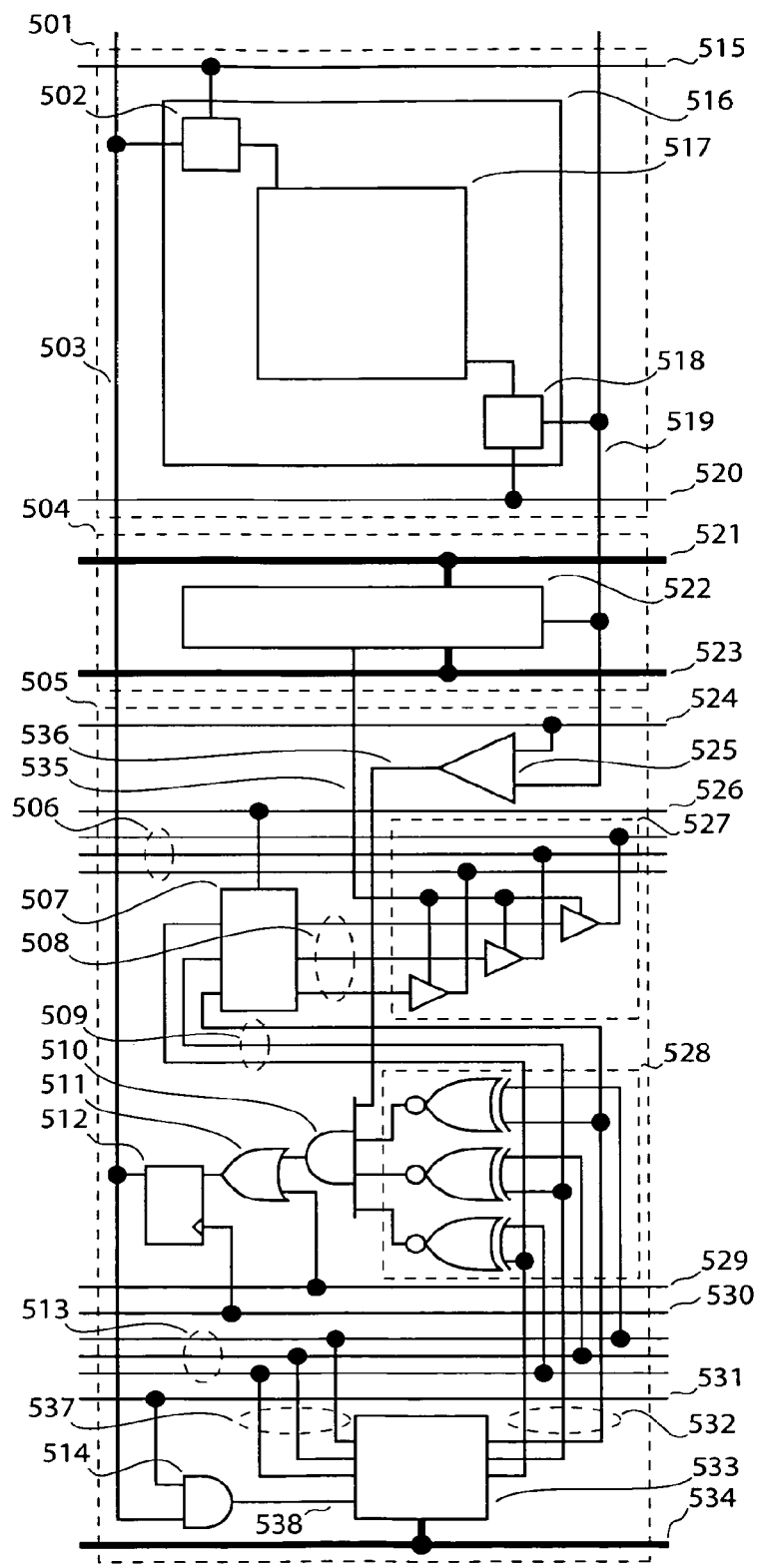
FIG. 5 depicts a simplified diagram of a circuit associated with one column of pixels in an imaging array.

FIG. 5 depicts a simplified diagram of the circuit associated with one column of pixels in an imaging array. In the diagram in FIG. 5, one pixel of the column which, for example, contains 420 pixels in the exemplary design is depicted as pixel 516 within block 501. In a preferred design, pixel processing is normally suppressed during the noise critical row read task and suppression of pixel processing during this period also allows the parallel portion of the row read task to be completed before pixel by pixel processing of pixels in the row is begun eliminating timing conflicts between the two tasks. Thus, the first 36 or so numerical columns of the imager are preferably not implemented providing about 590 readable columns. The imager pixel array is preferably restricted to rows which are actually read with the optional addition of some guard rows and possible rows and columns of dark reference pixels which are shielded from light around the periphery of the active imaging area. Column processing circuits need to be implemented only for columns which are read. Thus, for the complete implementation of the exemplary circuit, the array would have 590 columns each having 420 pixels with one pixel for each of the 420 rows of the exemplary imager. The remaining portion of the circuit would be replicated 590 times once for each of the 590 active pixels in the 626 pixel scan row. Here, as a side note, the exemplary imager is simplified to best illustrate the reset process which provides the exceptionally high dynamic range. Implementations of the imager which are also considered to be within the scope of the patent may include nearly any feature provided with prior art imagers. For example, features may be included in the readout structure to suppress readout of larger portions of the frame covered by the scanning process than just those which potentially conflict with the parallel portion of the row read task. The imager instruction set may include instructions which do not use the high dynamic range capability and which may accordingly provide added capabilities such as much higher frame repetition rates. In image based control applications, it is frequently desirable to supplement reading of a high dynamic range image with images which may be taken in faster sequence, using smaller scan frames which cover smaller portions of the overall field of view. Exposure for these images may, for example, be at least partially based on light levels observed in the high dynamic range image. For such applications, more traditional normal dynamic range imaging, perhaps in combination with flexible setting capabilities for the high dynamic range features, are useful combinations of conventional imaging techniques which may be used in combination with the high dynamic range features of this invention. The scan frame size, the choice of row and column offsets for each of the resets, and even the number of conditional resets per reading may optionally be programmable. The ratio of integration period from one reset to the next does not need to be 4 as in the exemplary design and does not need to be a constant for each successive integration period. For example, an imager might have some reset periods where the ratio of the period from one to the next is 4 and where the ratio of another to the next is 8 or even some non integral number or some value which is not an integral power of 2. There are a number of logically equivalent ways to implement the row and column count and addressing circuits. The count ranges may extend between low and high values where the low value may be nonzero and may even be negative. The count direction may be reversed to go from high to low. With such changes, the concept of modulo arithmetic must be extended so that the count values are sequenced to stay within the bounds of the intended frame and cover the intended ranges. Readout does not even need to be in a strict monotonic sequence, but application of nonstandard scan sequences to features such as the row offset applied to establish the integration times must be carefully planned to provide proper operation. Formulas to calculate scan time must also be extended to properly indicate integrations times for the modified frame scan structures.

In the exemplary design, there is a 24 millisecond interval between the first reset to initiate the nominal 32 millisecond integration interval and the next reset to initiate the nominal 8 millisecond integration interval. Closer spaced resets along with anti-blooming circuits normally used in pixels aid in minimizing spillover of charge from overexposed pixels into neighboring pixels. As an option, to shorten the long interval between resets, the second integration period might be chosen as 16.384 milliseconds for a 2 to 1 ratio instead of at 8.192 milliseconds for the 4 to 1 ratio. Then succeeding integration periods might be lengthened by 2 to 1 or one period might be changed to 8 to 1 or extra bits might be used to encode the tag for the integration period and more than 8 integration periods could be used. The balance between row offsets and row lengths and possible adjustments in integration periods to provide for non-conflicting column period intervals for each of the integration periods needs to be evaluated and appropriately chosen for each set of integration periods used in the high dynamic range mode of operation.

The row reset line 515 (one per each row), the row readout enable line 520 (one per each row), the column address bus 521, the pixel readout bus 523, the pixel reset reference value 524, the row buffer memory write enable 526, the integration time output bus 506, the unconditional pixel reset enable 529, the reset indication flip-flop clock 530, the integration period tag bus 513, the tag memory update enable 531, and the row address bus 534 are preferably routed to and shared by corresponding circuits for each of the active columns. The column reset line 503 and the column readout line 519 is preferably shared by each of the active pixels in the column. Representative pixel 501 is selected by asserting a select signal on row select line 520. Assertion of the row select signal on 520 enables transistor circuit 518 which drives column readout line 519 to a voltage level representative of the charge collected in light collection area 517 of the pixel. Reset circuit 502 causes the pixel to reset when signals are simultaneously asserted on row reset line 515 and column reset line 503. Block 504, shown in greatly simplified form, contains circuit 522 which includes column sampling capacitors and a column select circuit to respond to signals on column select address and control bus 521 and to sample signals on column readout line 519 in response to control signals on bus 521 and to gate the sampled pixel readout signals to readout bus 523 in response to assertion of the matching column select address along with appropriate control signals on bus 521. In the exemplary embodiment, a signal is asserted on select line 535 when the column is selected by the column address asserted on bus 521. As will be explained, select signal 535 is used to gate the memory record which indicates the integration period used to read the selected pixel to bus 506 in synchronization with readout of the analog pixel value which is derived from signals and analog values gated to bus 523.

Compare circuit 525 compares the signal level on column readout line 519 which is indicative of the light induced charge on the selected pixel against a threshold reference level on line 524. A logic true signal is asserted on output 536 when the signal 519 indicates that the light induced charge on the pixel exceeds the reference level indicated by signal 524. (It is intended that light induced charge refers to the change in charge level caused by the light exposure whether it is an actual enhancement or a depletion of the initial charge level).

Bus 513 is used to communicate the numerical integration period identifying memory tag for the integration periods. This numerical memory tag may be encoded in a number of ways. In the exemplary design, the longest through the shortest integration periods are assigned identifying numerical memory tags of 0 through 7, respectively. In a preferred embodiment, a pixel will be reset unconditionally for the longest integration period in a reading sequence and for successive shorter integration periods in the sequence, the pixel will be reset if and only if the compare output 536 is asserted for the pixel indicating that the light induced integrated charge on the pixel exceeds the threshold value on 524 and the pixel has also been reset for every previous longer integration period in the reading sequence. To fulfill the requirement to suspend further resets of the pixel once a reset of the pixel is missed, it is sufficient to check the integration period identifying memory tag entry for the pixel to see if the pixel was reset for the immediately preceding integration period. If not, the current reset is inhibited for the pixel regardless of the state of the compare output 536. If the tag for the pixel indicates that it was reset for the immediately preceding integration period and the integrated charge on the pixel exceeds the threshold value as indicated by compare output 536, the pixel is reset and the integration period identifying memory tag for the pixel integration period is updated to identify the integration period established by this reset of the pixel. The memory block 533 preferably has an entry for each pixel of the column, the current pixel being selected for read and write tasks by the row address of the selected row which is communicated on bus 534 and serves as the address input to memory block 533. The compare circuit 528 performs a bit by bit matching comparison of the integration period identifying numerical tag saved for the pixel against the tag value asserted on bus 513. The "and" gate 510 asserts a true output when and only when all three of the bitwise match comparisons match indicating that the memory tag value for the pixel matches the tag value broadcast on bus 513 and the compare output 536 is asserted indicating that the light induced integrated charge on the pixel of the selected row in the column exceeds the threshold value. "D" type flip-flop 512 registers a reset indication for the pixel when it is clocked by a clock signal on line 530. Line 529 is asserted at the appropriate time to force a reset of the pixel for the initial longest integration period setting. "or" gate 511 combines this unconditional reset command with the conditional reset indication just described from "and" gate 510. The output of flip-flop 512 drives the column reset line 503 for the selected column which, when asserted, causes reset of pixel 516 when row reset line 515 is also asserted during an overlapping time period. Reset line 515 is asserted at the proper time in the row processing sequence to selectively reset pixels for which associated column reset lines 503 are also set. As an option, additional gating logic may be added to assert vertical reset line 503 only when the reset task is to be asserted. Then the functions of the row select line 520 and the row reset line 515 may optionally be merged into a single line so that simultaneous assertion of select line 520 and column reset line 503 cause reset of the pixel. Memory update enable line 531 is asserted to update the integration period identifying tag for the pixel being processed in memory 533. The update is performed to the memory location selected by the row address asserted on address bus 534 when the memory update line 531 is asserted, and the pixel is reset as indicated by assertion of column reset line 503. The output 538 of "and" gate 514 which ands the update line 531 and the pixel column reset line 503 serves as the write enable to memory block 533. When write enable 538 is asserted, the numerical integration period identifying memory tag value for the integration period which is communicated on bus 513 is written into the entry for the pixel in memory block 533. In the conditional reset tasks, bus 513 is used to communicate two separate integration period identifying tags, each at a separate time interval within the sequence. Toward the beginning of the sequence, the tag for the immediately preceding integration period is communicated on bus 513 for use by compare circuit 528. Toward the end of the sequence, the tag value for the current integration period is communicated on bus 513 to update the memory indication as just described for pixels which are reset to initiate a new and shorter integration period.

The preceding discussion has focused mainly on column related conditional and unconditional reset tasks for the pixel in the selected row of the associated column. At the end of the integration period established by the sequence of reset tasks, the pixels of the row are read. The row read task is accomplished in two phases. The first of which is preferably a row parallel task which is preferably performed during a column count range which does not overlap the column count ranges used for any of the reset tasks. The second phase is preferably a pixel by pixel or a small pixel group by small pixel group processing stage and is preferably configured so that it does not require access to row select, row readout, column readout, or column reset lines needed for the ongoing reset tasks. Then the pixel processing in the second phase may overlap ongoing reset tasks and may optionally be performed using any one of a number of organizational approaches. For example, processing may be a pixel by pixel operation or, perhaps, a sequential operation using pipelining or parallel processing on small subgroups of the pixels in the row. For the first, preferably parallel stage of the operation, the readout select line 520 is asserted for the row of pixels being processed gating the pixel value to column readout line 519. A readout sequence which may be very similar to that used in prior art imagers is performed whereby the pixel value asserted on column line 519 is sampled by capacitors or other circuitry in pixel readout processing block 522. The sequence may include unconditional reset of the pixel and additional sampling of the reset value to be used as a zero reference for the pixel in the final readout task. In the preferred embodiment, the row address of the row being read is asserted on address bus 534 so that the integration period identifying tag for the pixel being read is presented on output lines 532 of memory block 533. As part of the row readout process, write enable line 526 is asserted to store the integration period identifying tag for the pixel being read in tag buffer memory 507. The task is preferably performed in parallel for all active pixels of the row so the integration period of each pixel of the row is available in the associated buffer memory 507 of the replicated column logic blocks.

In the exemplary embodiment, for the second phase of the readout sequence, the column address is communicated to pixel readout 522 on column address bus 521. This sequentially incremented column address is decoded in block 522 and serves to sequentially select column sampling capacitors for analog to digital conversion of the sampled pixel value and processing of the pixel and also to gate the integration period used for the pixel on bus 506. The final readout value for the pixel is adjusted to indicate the proper light level reading given the integration period used to acquire the reading. The record of the integration period which was used for the pixel reading is buffered in memory block 507. The column address decode logic in block 522 asserts output line 535 when the column is selected to enable bus drivers 527 to gate the integration period identifying tag stored in memory 507 onto bus 506. The pixel readout information which was sampled and held in block 522 is gated to readout bus 523, preferably using a select output from the same column select decoding circuitry used to gate the integration period identifying tag for the pixel. In the exemplary design, the pixel values which are adjusted to reflect the integration period are presented for readout sequentially just after completion of the analog to digital conversion and the adjustment to reflect the integration period used.

When range detection is done simultaneously with readout with certain pixel designs, it is advantageous to nondestructively read an indication of the integrated charge to determine when to do a reset. With pinned and/or buried photodiode structures or photogate structures, it is an option to transfer charge to the readout node before final readout, but this may interfere with reset and readout of the reset value of the readout node followed by transfer of accumulated charge and a second readout used in a correlated double sampling mode. For these structures, it may be preferable to do a shortened readout sequence to determine the integration period to use. For this task, a range determination period may be added before integration for readout begins and a sequence of preferably row parallel compare tasks (perhaps including multiple threshold compares to handle determination of more than one reset period option in a compare task) similar to those described for the combined conditional reset range may be used to determine the range to use. The integration period determined may be saved in the integration period memory associated with each pixel. This memory value may then be used during the readout phase to set the proper integration period for each pixel and also at readout to indicate the integration period used to read the pixel to properly scale the readout value.

For the separate determination of what specific integration period to use, it may be preferable to arrange compare and/or readout tasks for the determination of the integration period such that the option to use the shortest integration period is determined first with decisions to use successively longer integration periods determined in sequence. The integration periods for the actual reading are then preferably set in order with the longest integration period set first so that readout is preferably accomplished in the row parallel or partially row parallel task as with the combined readout and integration period determining sequence. With the sequence just described pixel selective resets are needed to start integration periods at the proper times so that all integration periods for pixels in the group preferably end at the proper time. With this sequence, selective transfer of charge to the readout node may replace selective reset of the readout node.

In at least one embodiment, an imaging device is configured to, during the normal image acquisition period for a single readout frame; dynamically select an integration period individually for each desired pixel, the integration period being automatically chosen from a set of selectable integration periods which includes a limited number of selectable periods each having an identifying index; set the integration period for the given pixel to the selected integration period and record in memory associated with the given pixel an indication of the identifying index of the integration period selected for the pixel; perform integration; read and digitize the pixel reading at a predetermined time; and output an indication of the digitized reading along with an indication of the selected integration period.

In at least one embodiment, the imaging device includes an imaging array of pixels arranged in groups of pixels which are addressed in parallel and includes circuits to perform various parallel tasks on pixels in the, then, currently addressed parallel addressable group. All of the pixel read and reset tasks, including those which perform conditional, selective reset tasks, are intended to operate on all of the active pixels of the parallel addressable group of pixels that is being accessed. For all of these tasks, it is preferable to perform all or at least substantial portions of the following tasks in parallel or at least partially in parallel for active pixels in the addressed parallel addressable group which are operated on in the task: pixel read, pixel reset, conditional selective pixel reset, compare of pixel value after partial integration against a threshold, read and writes to memory associated with a pixel, logic to determine when to selectively reset a pixel, and readout of the integration period associated with each pixel at final pixel readout. In at least one embodiment described herein, the groups of pixels which are addressed in parallel are arranged in rows and readout is performed a row at a time with a pixel clock supplied to control the pixel conversion rate and to supply finer timing increments to clock and sequence logic functions. In this discussion the term "row" is replaced with the more broad term, "parallel addressable group". The term "row time" is replaced by "task sequencing interval" which is used to indicate the interval used to schedule and perform readout of pixels in a parallel addressable group and to also schedule and perform more diverse reset and selective reset tasks. The term "pixel clock" is replaced by the more functionally descriptive term "sequencing clock". It should be understood that principles of this invention are not limited to devices where readout is performed a row at a time or where clocking is directly tied to pixel rate but extends to the more general context implied by "parallel addressable group", "associated task sequencing intervals" and "sequencing clock". Each pixel of a parallel addressable group is set to an integration period based on its response to the light to which it is exposed and each pixel in the parallel addressable group is read in a partially parallel read task during the associated task sequencing interval. Pixels of the array include a selective reset capability whereby pixels of each parallel addressable group may be selected for reset on a pixel by pixel basis. The pixels preferably also include provision to read an indication, preferably analog, of the integrated charge, preferably nondestructively, after partial integration. For acquisition of a particular image, the imaging device is preferably configured so that, for each active pixel, successively shorter integration periods may be selected from a preferably predetermined set of available integration periods through use of the selective reset capability. Each member of the set of available integration periods is preferably identified by an associated integration period identifying index. Each active pixel of the array preferably has an associated memory element which is used to store an indication of the integration period identifying index of the integration period which is in progress for the associated pixel. To begin a new reading, each pixel is unconditionally reset to begin its longest available integration period and its associated memory element is initialized to indicate the integration period identifying index of the longest available integration period. During the longest available integration period for a given pixel, at each of a set of predetermined times during this period, the pixel is subjected to conditional selective reset tasks to conditionally initiate a shorter one of the available integration periods. The general intent is to provide conditional reset criteria which provide good utilization of the full scale range for each pixel but which keep the integration period short enough for each pixel to maintain an acceptably low probability that the pixel will saturate. As is described in greater detail elsewhere herein, each of the decisions to selectively reset each pixel is partially based on the comparison of an indication of the integrated charge read (preferably in analog form) after partial integration (i.e. after partial completion of the integration period which is currently active for the pixel) to a pre-selected threshold level (The pre-selected threshold level may be a constant or may be dependent on the integration period for which it is applied and perhaps on its position within the array or some other variable). Each of the selective reset tasks is used to conditionally initiate a successively shorter integration period from the set of selectable integration periods. Whenever a pixel is reset to begin a shorter integration period, the record in memory which is associated with the pixel of the identifying index of the currently active integration period for the associated pixel is updated to indicate the identifying index of the integration period which is being initiated. The final reset of the pixel establishes the integration period used to read the pixel. In the preferred sequence of successive reset tasks for a given pixel for a given readout period, once a conditional reset for a pixel is bypassed due to a decision partially based on the result of the compare task, no further resets are performed on the given pixel prior to readout of the pixel. To implement this criterion, the memory indication for the pixel is checked as necessary and conditional reset of a pixel is inhibited if it was not reset in an immediately previous conditional reset task for the pixel. For a conditional reset task, if the pixel was reset in the immediately preceding reset task for the pixel, it is preferably reset when and only when the result of the compare task for the pixel indicates that the level of the integrated, light induced charge on the pixel exceeds the threshold value against which it is compared as part of the conditional reset task for the associated selectable integration period. At the end of the integration period for a given pixel, the indication of the identifying index of the integration period selected for the pixel is read from the memory element associated with the pixel and the light induced integrated charge stored on the pixel during the selected integration period is read from the pixel and preferably digitized as a digitized pixel charge level reading. The reading of the preferably digitized pixel charge level is paired with the indication from the memory associated with the pixel of the integration period used for the pixel. Together, the digitized pixel charge level reading and the integration period selected for the pixel indicate the light level to which the pixel was exposed. This information is normally assembled in a convenient, correlated form and communicated from the imaging device to an external device or optionally to another memory or image handling function within the imaging device itself.

In an exemplary design, the selectable integration periods are chosen such that each successively shorter integration period is shorter than the next longer integration period by a prescribed ratio. In at least one embodiment, each succeeding selectable integration period is 4 times shorter than the next longer selectable integration period so that there is a nominal 4 to 1 ratio between any two successive selectable integration periods. This provides a nominal 16,384 to 1 ratio between the longest and shortest of the eight selectable integration periods. Ratios other than 4 may be chosen and not all successive selectable integration periods have to differ by the same ratio from their immediate predecessor or successor and more or fewer selectable integration periods may be provided. In at least one embodiment, the range of approximately 16,384 to 1 from the longest to the shortest integration period adds 84 dB to the dynamic range of typically more than 50 dB provided by digitizing the light induced integrated charge on the pixel. This provides a dynamic range of more than 134 dB with a nearly linear output independently for each pixel for each image acquired. These are conservative estimates and dynamic ranges well above 140 dB are attainable with variants of the design. Furthermore, as detailed elsewhere herein, with a 10 bit A/D, the minimum resolution may be better than a part in 100 or, ideally as great as a part in 250 over a large part of the total light level range. With higher resolution A/D's and/or greater ranges of integration time in the selectable integration periods the dynamic range may be extended and with higher A/D resolution, or closer spaced selectable integration periods, minimum resolutions of greater than 250 to 1 may be maintained over large ranges in light level.

In contrast to certain other high dynamic range imagers, only the index of the selected integration period needs to be recorded in a memory block. In at least one embodiment, a 3 bit memory item is used to store the identifying index of the integration period which is currently active for its associated pixel. The 3 bit item requires less than one fourth of the memory which would be required to store the full 13 bit value saving substantial memory space in comparison with high dynamic range designs which require storage of a complete or nearly complete image frame. The memory block used to identify the integration period for each pixel is preferably fabricated on the same silicon substrate as the imaging array and may optionally be constructed of dynamic memory elements. The value for each pixel needs to be stored only through the duration of the full integration and readout period for the associated pixel. The limited storage time needed during the actual exposure sequence limit the time period that values need to be held in storage and the repeated memory access and write tasks during the conditional reset tasks provide additional, natural refresh tasks limiting or even eliminating additional refresh tasks which may be needed when dynamic memory elements are employed. In an exemplary design, the 24 ms period between the initial unconditional reset and the first conditional reset is the longest interval between successive memory read/write tasks which provide refresh for a particular location in the memory. For some dynamic memory designs, more frequent refresh cycles may not be needed. If more closely spaced refresh cycles are needed, added memory access cycles may be inserted during idle periods between execution of the parallel addressable group read task and/or parallel addressable group reset tasks within each task sequencing interval to provide additional refresh cycles as needed. These refresh tasks may be structured and scheduled as a refresh task or tasks during each task sequencing interval much like an added conditional reset task by assigning the number of task sequencing interval time periods appropriate to the timing requirement and by assigning a sequencing clock count value (Task sequencing intervals and sequencing clock counts are defined below). to initiate the refresh task during which the memory location is accessed and rewritten (as necessary) to perform the added refresh cycle. The change in timing caused by various choices of the sequencing clock count value is very small relative to the time period provided by multiple task sequencing intervals needed for the refresh intervals so available intervals of sequencing clock count time which do not interfere with the parallel addressable group read, or one of the reset intervals already scheduled during the task sequencing interval may be selected for providing the added memory refresh cycles.

The choice of ratiometrically proportioned integration periods, from one to the next shorter, allows the ratio between any two adjacent integration periods to be relatively small (4 in at least one embodiment) and to still provide for a very large range of integration time with a reasonably small number of selectable integration periods (A range 16,384 to 1 in integration time is provided with 8 selectable integration periods in the above referenced exemplary design). There is a tendency to look at the eight available integration periods and the nominal 32 ms of the longest integration period and conclude that 32 ms/8 or 4 ms is nominally available to handle each integration range. With this viewpoint, it is easy to overlook the added timing limitations in available processing time presented by the very short time interval between initiation of the next to the shortest and the shortest of the selectable integration periods (6 μs in at least one embodiment) and the scheduling and hardware performance requirements that this creates to enable the imager to perform the needed functions on multiple pixels within the short time interval. In at least one embodiment of this invention, a rolling shutter design is used as a starting point and a novel combination of features is added to provide the necessary device functions to perform necessary tasks during the various available time periods, including the very short ones, to obtain the exceptionally wide pixel by pixel dynamic range. Pixels are partitioned into parallel addressable groups for readout and reset tasks and readout of the parallel addressable groups of pixels is distributed, preferably task sequencing interval and associated parallel addressable group by task sequencing interval and associated parallel addressable group, at the uniform time increments provided by the task sequencing intervals within the time period provided to read all of the parallel addressable groups of pixels of the image frame. Tasks to select and establish the appropriate integration period for each pixel are also scheduled and organized within the task sequencing intervals. Preferably, readout of pixels in a parallel addressable group is done at least partially in parallel, a parallel addressable group at a time during successive task sequencing intervals, by transferring pixel values of the selected parallel addressable group into a group of sampling circuits. Pixel related values retained in the group of sampling circuits are then preferably conditioned and digitized, optionally in sequential order, to render a digitized reading indicative of the light induced integrated charge for each pixel of the sampled parallel addressable group. For each pixel, the digitized reading indicative of the light induced integrated charge is then paired with an indication, read from a memory item associated with the pixel, of the integration period used for the pixel. Together the pixel reading and the integration period used for the reading indicate the light level sensed by the pixel and this indication of the light level read by the pixel is output from the imaging device.

In the image acquisition sequence in an exemplary design having eight selectable integration periods, nine tasks are scheduled for pixels of each addressable group to complete integration and read the pixels of the addressable group. The tasks include, unconditional reset, and multiple conditional reset, one conditional reset for each selectable integration period after the first, to conditionally initiate the selectable integration periods at proper times by scheduling and performing each of the required tasks in the appropriate task sequencing interval at the appropriate time, based on the sequence count, within the task sequencing interval. Finally, at the end of the integration periods for pixels of the given parallel addressable group, readout of the pixels in the addressable group is scheduled. In the cited exemplary design, each parallel addressable set of pixels must be scheduled for eight separate tasks (one task for each selectable integration period) to initiate or conditionally initiate each of the selectable integration periods for each active pixel of the parallel addressable group. In the preferred organization where all the selectable integration periods for pixels of a given selectable group are initiated so that they end at the same time, regardless of the specific integration period which is selected, initiation of the various selectable integration periods for pixels in the given parallel addressable group do not in general occur in the same task sequencing interval. In the cited exemplary design having eight selectable integration periods, the three shortest integration periods for a given parallel addressable group are initiated in the same task sequencing interval at different sequencing clock counts and the readout and initiation or conditional initiation of the remaining five selectable integration periods for pixels in the given parallel addressable group are all initiated in different task sequencing intervals so that, for the cited exemplary design, various tasks for a given parallel addressable group are sequenced from a total of seven different task sequencing intervals. There may be as many active parallel addressable groups of pixels as there are task sequencing intervals in a frame reading sequence so, in general the readout task and a separate task to initiate or conditionally initiate each of the selectable integration periods is performed for some addressable group of pixels (for each addressed addressable group of pixels which is active) during each task sequencing interval. For the exemplary design cited above, the read task plus eight reset or conditional reset tasks are scheduled during each task sequencing interval with seven different addressable groups normally being selected by the nine tasks performed in a given task sequencing interval, the seven different parallel addressable groups including one parallel addressable group which is scheduled for conditional initiation of each of the three shortest integration periods during the associated task sequencing interval. If parallel addressable groups which are not equipped or not active are addressed, the hardware is configured so that the tasks are harmless or so that they are inhibited. In the above, tasks scheduled in a given task sequencing period include tasks which each operate on different parallel addressable groups.

The task sequencing time interval is broken into task sequencing time interval sub-increments which are called sequencing clock periods and a count of sequencing clock periods is normally initialized at the start of each task sequencing interval and incrementally advanced to provide a time base within the task sequencing time interval. For designs utilizing serialized digitization and/or output of the pixels, the sequencing clock period is conveniently chosen to correlate with pixel processing rate. In traditional terminology a row of pixels corresponds to a parallel addressable group, a row processing time interval corresponds to a task sequencing time interval, and a column or pixel clock count time interval corresponds to a sequencing clock count time interval. Readout of pixels in a parallel addressable group is preferably performed at least partially in parallel allocating an associated task sequencing intervals for readout and for scheduling and performance of tasks to select and establish the correct one of the selectable integration periods for each pixel of addressable groups scheduled for an unconditional reset or a conditional reset task during the task sequencing interval. Each of the unconditional and conditional reset tasks to initiate a given one of the selectable integration periods for the pixels of a given addressable group of pixels are scheduled and performed in a task sequencing interval and over a sequencing clock count range within the task sequencing interval which provide the proper number of intervening task sequencing intervals and, fractional task sequencing interval, sequencing clock offset counts to provide the correct duration for the particular selectable integration period. The number of integral task sequencing intervals in a particular integration period is used as the course timing increment and the additional sequencing clock count offset value is used to provide the finer timing increment used to determine the duration of a particular selectable integration period. During the task sequencing interval, readout of an addressable group and associated digitization and output of the pixels is accomplished. The preferably parallel portion of the total row read task takes a relatively small part of the total task sequencing interval time. During the remainder of the task sequencing interval, at specific times, preferably based on the sequence clock count, various ones of the selectable integration periods for various ones of the parallel addressable groups of pixels are subjected to scheduled reset or conditional reset tasks to initiate or conditionally initiate selectable integration periods at times scheduled to properly establish the integration times for the pixels of parallel addressable groups which are subjected to the tasks and which will be read during succeeding task sequencing tasks. At the end of the allotted number of sequencing clock counts allocated for the task sequencing interval the sequencing clock count is used to sequence the task sequencing interval identifying index to reference the next task sequencing interval and associated parallel addressable groups and begin a new task sequencing time interval.

Image frames with task sequencing intervals with their associated parallel addressable groups and with their sequencing clock time units are normally sequenced in a repetitive frame by frame, task sequencing interval and associated parallel addressable groups by task sequencing interval and associated parallel addressable groups, and sequencing clock count by sequencing clock count cadence. Each task sequencing interval is assigned an identifying index to identify its position within the image frame capture sequence. Sequencing clock count values (or corresponding pixel positions) within the task sequencing interval are assigned numerical index values so that coordinates within the image capture sequence for that frame may be expressed in terms of a coordinate value pair consisting of a task sequencing interval identifying index and sequencing clock count value or number. These task sequencing interval identifying index and sequencing clock count are stored in some form in hardware registers in the circuitry in the imaging device to provide a time base to sequence events in the image acquisition sequence including integration period time interval control, selection of parallel addressable groups, selection of pixels within a group, selection of hardware components and initiation of events in the image acquisition sequence.

The orderly progression through imaging frames, through successive task sequencing intervals of the frame and through a sequencing clock count range for a task sequencing interval is somewhat analogous to a clock where an hour could be compared to an image frame scan time with 60 minutes where each minute could be compared with a task sequencing interval and with 60 seconds where each second could be compared with sequencing clock count times. This is a loose comparison, since in an exemplary design the image frame acquisition time is approximately 32 milliseconds which is broken into 419 task sequencing intervals and associated parallel addressable groups each of which is broken into 626 sequencing clock periods or pixel times each pixel time being about 0.125 microseconds in duration (In the exemplary design referenced above, the row scan time is used as the task sequencing interval and the pixel clock is used as the sequencing clock).

Time intervals, such as integration times are conveniently established by counting task sequencing intervals for coarse timing increments and additional sequence clock count offsets that occur to sequence between starting and ending points in task sequencing cadence for finer timing increments. A task may begin at a sequencing interval with its identifying index within the scan sequence in combination with a starting sequencing clock count in the starting task sequencing interval and end at a task sequencing interval with its identifying index within the scan sequence in combination with an ending sequencing clock count in the ending task sequencing interval. Using the task sequencing intervals and sequencing clock counts as a time base, time intervals may be expressed using the number of task sequencing intervals to express the coarse portion of the timing increment and a sequencing clock count offset to express the fine portion of the timing increment. The fine portion of the timing increment is preferably expressed as a signed difference of the sequencing clock count at which the interval ends in the ending task sequencing interval minus the clock count at which the interval begins in the beginning task sequencing interval. To express the time interval for an integration period, it is preferable to take the difference, using modulo arithmetic, of the identifying index of the ending task sequencing interval where readout takes place minus the identifying index of the starting task sequencing interval where reset takes place to begin the integration period. The readout typically occurs, ending integration, at a low sequencing clock count early in the task sequencing interval period and integration periods are started, typically later in their respective task sequencing intervals, at higher sequencing clock counts and the sequencing clock count offset for the integration period, is calculated as the sequencing clock count (within the task sequencing interval) at which the integration period ends minus the sequencing clock count (within the task sequencing interval) at which the integration period begins. This result is signed and may be negative. In at least one embodiment it is preferable to select a range of sequencing clock count times for readout of pixels in a task sequencing interval so that the sequencing clock count within this range at which the effective integration ends prior to readout is the same for each task sequencing interval and may be referenced as a known sequencing clock count value at which the integration period ends. In the following description, the identifying index for a given task sequencing interval will be assigned so that it is equal to the address of the parallel addressable group which is read out during the given task sequencing interval. As a further option, an offset to origin the readout frame may be added to calculate physical pixel locations. Further successive sequencing task period identifying index values are assigned as consecutive integers which range from the value corresponding to the beginning of the frame scan sequence and increase incrementally to the value corresponding to the value corresponding to the end of a frame scan sequence. This is convenient for hardware implementation since a task sequencing interval identifying index may be used to directly select a parallel addressable group for readout and the "look ahead" function to select a parallel addressable group to reset or selectively reset pixels within the parallel addressable group to initiate an integration period is effected by adding the number of task sequencing intervals for the integration period, using appropriate modulo arithmetic, to the parallel addressable group address used to select the parallel addressable group to read. Then, after a reset or conditional reset task, as the scan cadence continues, the parallel addressable group for which the reset task was applied will be read after progressing through the number of task sequencing intervals determined by the value expressing the integration period in terms of the number of task sequencing intervals which were added. Further if the sequencing clock count range over which the parallel addressable group is reset or selectively reset is selected such that reset occurs at the prescribed, signed sequencing clock count offset relative to the sequencing clock count at which the integration period ends, the reset will be performed with the correct number of task sequencing intervals and the correct sequencing clock count offset interval to initiate the integration period at the instant which will yield the desired integration period. Thus adding the number of task sequencing intervals in the integration period to the task sequencing interval identifying index, using modulo arithmetic, and initiation of the reset or conditional reset task at the sequencing clock count times which are pre-selected to initiate the reset to provide the desired signed sequencing clock count time offset relative to the sequencing clock count time selected for the end of the integration period is used to provide integration over the desired number of task sequencing intervals in combination with the desired, signed sequencing clock count offset to select the desired integration time.

Integration intervals for groups of pixels which are read in parallel are preferably reset or conditionally reset in parallel using the same grouping for these tasks as for readout. In at least one embodiment appropriate parallel compare, logic, and memory access functions are provided to implement the parallel conditional, pixel selective reset tasks. A number of components including parallel addressable group select, task sequencing interval offset adder, column readout lines, pixel associated memory access, and the parallel set of conditional reset compare and logic circuits are shared by various integration period specific unconditional or selective reset tasks and by the parallel addressable group read function and possibly by added memory refresh functions. To avoid conflict in the use of hardware resources, the parallel addressable group read, each of the reset functions to initiate a specific selectable integration period, and added memory refresh functions are performed in pre-assigned substantially non-overlapping time intervals (or during time intervals which are assigned so that shared resources are available as required) characterized to prevent contention for shared resources during each task sequencing interval. In a preferred implementation, this objective is satisfied by providing hardware based task scheduling functions which sequence the parallel addressable group read, the unconditional reset, and each of the conditional reset tasks, one for each of the conditionally selectable integration periods so that they are performed during substantially non-overlapping ranges of sequencing clock counts during a task sequencing interval. Additionally, where desired, memory refresh tasks are also added to the list of tasks performed over substantially non-overlapping ranges of sequencing clock counts. To accomplish this scheduling in a way which avoids conflicting use of resources, each specific task is preferably initiated in response to reaching a predetermined sequencing clock count during each task sequencing interval, the predetermined sequencing clock counts being chosen such that there are no overlapping tasks which would conflict. It is preferable to perform the sequence just described for each task sequencing interval in the progression of parallel addressable group addresses through successive frames. Whenever, after application of appropriate offsets, a parallel addressable group with pixels in the active area is selected, the sequenced task is performed but is preferably suppressed or done in a way that there are no harmful effects when an addressed parallel addressable group is not in the active imaging area. By performing the parallel addressable group read and each of the reset and conditional reset tasks whenever a parallel addressable group with pixels in the active image area is addressed, all of the tasks are performed for every parallel addressable group with active pixels.

There are two sets of possibly conflicting criteria for selection of sequencing clock count ranges for the parallel addressable group read and the reset tasks to initiate the various integration periods. The first criterion is to provide sequencing clock count ranges for task assignments within a task sequencing interval for execution of the parallel addressable group read and reset tasks which are non-overlapping or at least partially non-overlapping in a way that shared resources are available as needed. A potentially conflicting second criterion is to provide sequencing clock count ranges for task assignments within a task sequencing interval for execution of the parallel addressable group read and reset tasks which provide respective sequencing clock count offsets to establish the desired integration period for each of the selectable integration periods. In an exemplary design, a combination meeting these criteria is demonstrated. Conflicts may be found by choosing sequencing clock count ranges within a task sequencing interval to properly set integration time periods and inspecting for overlapping sequencing clock count ranges for the task assignments and/or conflicts in use of resources. Conflicts which occur for the shorter integration periods are often resolved by small adjustments in the design such as scaling all integration periods by a small factor or small changes in the number of sequencing clock periods per task sequencing interval. For longer integration periods, changes in the sequencing clock offset may have a very small effect on the integration period relative to the time in the larger number of task sequencing intervals in these integration periods so that sequencing clock ranges for the tasks may often be adjusted to avoid contention in the use of resources with minimal effect on the resulting integration period.

Integration periods may be chosen (as in an exemplary design) so that successively shorter integration periods provide a ratio of the effective sensitivity of the pixel for each integration period to the effective sensitivity of the pixel for the next successively shorter integration period which is equal to the exponential base of a number system used to represent the reading. For example, in an exemplary design, each successively shorter integration period is chosen so that it is 4 times shorter than the immediately longer integration period yielding corresponding decreases in sensitivity which is nominally 4 to 1 for each successively shorter integration period. Additionally, the identifying indices assigned to the integration periods (call them i) are chosen in an exemplary design so that 0 is assigned to the longest integration period and so that the assigned index increases incrementally to 7 for the seven successively shorter integration periods. Let a represent the A/D reading of the light induced integrated charge on the pixel. Let b represent the exponential base for the numerical representation of the reading which preferably represents the light level in approximately linear form. Then the light level v may be expressed as $$v = a \cdot b^i$$

or as $$v = a \cdot 4^i$$

where a is the A/D reading for the pixel, i is the index of the integration period used to obtain the reading, and 4 is the base, b, which is established by selecting successive integration periods each nominally 4 times shorter than the next longer so that the sensitivity is reduced by a corresponding factor of 4. This may also be expressed as $$v = a \cdot 2^{2 \cdot i}$$

In binary format, for values of i ranging from 0 through 7, 2·i may be obtained by assigning 0 to bit 0 of the binary number and assigning bits 0 through 2 of i to bits 1 through 3, respectively, of the binary number. The number v may be readily mapped to a floating point format using various procedures including the exemplary procedure just outlined. In the readings given in exponential notation, a above is preferably mapped directly or optionally scaled and mapped to the mantissa and i or 2·i, depending on the base, is mapped with an optional offset and/or scale factor, as appropriate, to the exponent.

As an option, the exponential representation of the pixel value above may be exploited to facilitate conversion to logarithmic form. To convert pixel values to logarithmic form, values are preferably first normalized to place the binary or radix point in a preferred location (analogous to adjusting the exponent and mantissa to provide a mantissa with a value greater than or equal to 1 and less than 10 for nonzero values for scientific notation). The mantissa is preferably then converted to its logarithmic equivalent using a hardware and/or software based circuit. The exponent, after appropriate scaling, may be added to the logarithm of the mantissa to provide the logarithmic value for the pixel. With appropriate choice of the radiometric interval for the selectable integration periods, the scaling factor may be an integral power of 2 allowing direct insertion of the exponent into the logarithm of the mantissa to provide the logarithmic value for the pixel reading.

Now let us look at the imaging array from a task, resource, and scheduling perspective. An imaging array has pixels organized in multiple parallel addressable groups of pixels (rows of pixels in an exemplary design). Pixels of each parallel addressable group may be addressed to select them as a group to perform hardware based tasks, preferably at least partially in parallel, on them as part of the image acquisition sequence. The individual separately scheduled tasks to be performed for each pixel of the imaging array for each image frame which is acquired include a task to read, digitize and output or optionally to perform further tasks on the pixel, and also at the time that each of the selectable integration periods is initiated for the pixel to perform the task to initiate integration or conditionally initiate a new integration period. Eight selectable integration periods are included in an exemplary design. Thus, for an exemplary design, there are nine tasks to schedule and perform for each pixel to acquire a reading for the pixel. As an option (not preferred), a reset which is part of the immediately preceding read task for a given pixel may be used to initiate the longest of the selectable integration periods for the pixel and, as a second option, the shortest of the integration periods might be combined as part of a lengthened read task for the pixel. Either option is considered part of this invention but not preferred because each limits flexibility. In any event, for the exemplary design, for each pixel, there are seven to nine tasks for readout and pixel reset plus possible additional tasks for items such as memory refresh to separately schedule and perform to establish the proper selectable integration period and read the pixel. This example may be readily extended for other numbers of selectable integration periods and such extensions are also considered to be part of this invention. The separately scheduled tasks are performed for each active pixel for each image frame which is acquired. Additionally, with the ratiometrically or geometrically decreasing integration times of the successively shorter integration periods, the shorter periods are very close together as noted elsewhere. In the preferred imaging device to provide for completion of the necessary tasks at the required times: parallel hardware based conditional reset tasks are performed; the integration period is established, preferably individually, for each pixel for each image acquired; the selection of a shorter selectable integration period for each pixel is partially based on comparison of the indicated pixel value (preferably in analog form) against a threshold value after partial integration; new and shorter integration periods are initiated by performing a selective reset on the pixel at the correct instant to complete integration on the original predetermined schedule; the selectable integration period to use to read each pixel is established during time allotted for the longest selectable integration period for the pixel during the image acquisition period and before completion of the integration period and final readout and digitization of the pixel value; pixel values are digitized only once for each image acquired; an indication of the integration period currently in progress for each pixel is recorded with initiation of each new conditionally selectable integration period which is initiated for the pixel.

With the tasks and resources briefly described above, the main focus here is organization and scheduling for a given image acquisition sequence. The imaging device preferably has the flexibility to adjust many parameters such as the "comparison thresholds" for selective reset tasks, active "image frame size" including the number of task sequencing intervals in the frame, the number of sequencing clock periods in a task sequencing interval and the number duration of the sequencing clock period. The use of and the number of selectable integration periods is also preferably programmable. Pixels are organized in parallel addressable groups, with pixels in a group being accessible in an at least partially parallel manner for performance of tasks by issuing the address of the parallel addressable group. The parallel addressable groups with active pixels preferably contain equal numbers of active pixels in each parallel addressable group. The image acquisition interval will be considered to be the interval between capture of one image and capture of a succeeding image when operating in a continuous capture mode. The image acquisition interval is divided into task sequencing intervals which are preferably of equal duration and which preferably fill the image capture interval. There are preferably at least as many sequencing intervals as parallel addressable groups with active pixels. Task sequencing intervals are divided into a preferably fixed number of numbered sequencing clock periods. There are preferably at least as many sequencing clock periods in a task sequencing interval as there are active pixels in an addressable group. It is preferable to assign the same numerical value for use as an address to select a parallel addressable group and for use as an index to identify a particular task sequencing interval and it is further preferable to schedule readout of pixels from a parallel addressable group when the like numbered task sequencing interval is active. It is also preferable to assign addresses as consecutive integers in the same sequential order for which the task sequencing intervals become active. In this way, modulo arithmetic may be used with addition or subtraction to handle address offsets in the hardware and in computation of integration periods where timing control is preferably based on the number of task sequencing intervals and the fractional part of a task sequencing interval is preferably based on sequencing clock periods.

With assignments and terminology above, readout of pixels of each addressable group is scheduled during the corresponding task sequencing interval. The readout task preferably contains a portion which is performed substantially in parallel for active pixels of the parallel addressable group. During this substantially parallel portion of the readout, the integration period ends at a predetermined sequencing clock count and analog information from each pixel is transferred to an associated sampling circuit. The substantially parallel portion of the readout task is preferably sequenced over a predetermined range of sequencing clock periods. The parallel portion of the readout takes a relative small portion of the task sequencing interval and the remainder of the interval is available for other tasks including reset and selective reset tasks. For scheduling the reset tasks, there are a number of possible vantage points from which to view the scheduling arrangement. In FIGS. 1 and 2 relating to an exemplary design, rows and columns or pixel values in these FIGS. and in the related description may be compared: a row time and related row, to the more generalized task sequencing interval with its related parallel addressable group and a pixel clock or count to the more generalized sequencing clock count. FIGS. 1 and 2 each depict a row read task for only one row of the array and indicate the row and column offsets of the unconditional row reset and each of the seven conditional resets performed on pixels in the row indicated for readout to determine and select the appropriate selectable integration period of each pixel of the row to prepare the row for readout. In this view, we start with the row which was read and look back to the reset and conditional reset tasks performed to prepare the row for readout. Active pixels of each parallel addressable group are subject to conditional reset tasks during more than one task sequencing interval.

Now we will view the task scheduling from the perspective of looking at the list of tasks which are scheduled for execution during a particular task sequencing interval. In a given task sequencing interval, a task is scheduled to read out active pixels of an associated parallel addressable group and reset tasks, one associated with each of the selectable integration periods, are scheduled. During the task sequencing interval an unconditional reset task is scheduled to unconditionally reset pixels of the parallel addressable group for which the longest integration period is initiated. Each of the remaining reset tasks is associated with a particular one of the shorter selectable integration periods and is configured to selectively reset pixels, on a pixel by pixel basis, to selectively initiate the associated shorter integration period for pixels which are selectively reset. During the task sequencing interval, a reset task associated with each of the selectable integration periods is provided. The parallel tasks associated with readout of active pixels of a parallel addressable group are scheduled over a range of sequencing clock times within the task sequencing interval and portions of the row read which do not require use of resources shared with the reset tasks, such as digitizing pixel values sampled in the parallel portion of the row read task, are scheduled through the remainder of the task sequencing interval. The reset tasks, one for each selectable integration period, are scheduled, preferably following the parallel tasks for the read task, through the remaining portions of the task sequencing interval, the scheduling being arranged to prevent contention for shared resources and to initiate integration periods, unconditionally or selectively for individual pixels as required, at a sequencing clock count within the task sequencing interval which provides initiation of the selectable integration period of the desired duration. For each of the scheduled reset tasks, the base address used to select the parallel addressable group of pixels on which to perform the task is modified, based on the number of task sequencing intervals in the selectable integration period associated with the reset, to select the parallel addressable group, (a "row" in an exemplary design) which will be read after this number of task sequencing intervals thereby providing the desired integration period. By repetitively performing this set of tasks for the same task list and same sequencing clock intervals for active pixels in addressable groups selected in each of the task sequencing intervals, all of the pixel readout tasks are performed in a predetermined order on a predetermined schedule and all of the unconditional and conditional resets are performed for each active pixel to select the appropriate one of the selectable integration periods for the pixel.

For each parallel addressable group, as soon as pixels are read to complete one image, integration for capture of the next image may begin. With the progressive, task sequencing interval associated parallel addressable group by task sequencing interval associated parallel addressable group readout of pixels of the image, the above implies that for modes of operation where successive images are captured one after another, integration periods to capture the image for a succeeding image frame may begin before all integration and readout of all pixels of the preceding frame have been completed. Additionally, with the orderly task sequencing interval associated parallel addressable group by task sequencing interval associated parallel addressable group readout process, pixel values are presented for readout in an orderly, predetermined sequence with exactly one pixel value being presented for each image which is acquired. Scheduling and arrangement of the selectable integration periods is such that readout occurs on a predetermined schedule which does not depend on individual integration periods selected for various pixels. In this way, digitized pixel values are acquired exactly once per active pixel per image and presented in a known, predetermined order for direct output or further processing without necessity for buffering major portions of the image to re-order pixels or to provide for selection of values when multiple readings are acquired for a pixel in the image acquisition process or when acquisition of digitized pixel values is staged and effectively interspersed for pixels over a large part of the array. For each pixel of the array: a selection of the integration period for the pixel is made from a limited set of selectable integration periods; an indication of the selected integration period is recorded; scheduling is such that the selected integration period ends and readout and digitization of the pixel value occurs at a predetermined time in the image capture sequence.

The 3T pixel structure typically includes a light sensing photodiode, a first transistor which is configured to reset the pixel to a specified potential (normally its highest operating potential), a second transistor which is configured in a source follower configuration to serve as a buffer amplifier to provide a lower impedance output which tracks the voltage on the photodiode, and a third transistor to connect the buffered pixel output to an output sensing line. In most prior art devices, each pixel is reset and arranged to accumulate light induced charge during an integration period which is selected for all pixels of the array. At the end of the integration period for a given pixel, the third transistor is turned on to gate the buffered pixel voltage to the output line where it is sampled. The readout normally includes a second phase in which the first reset transistor is turned on briefly to reset the pixel and the reset level is also gated to the output line and sampled as a non-correlated double sampling reference level. As described elsewhere herein, in at least one embodiment, the pixel voltage is sampled nondestructively at prescribed times during the image acquisition sequence to determine when to selectively reset the pixel to initiate a shorter integration period and an indication of the integration period which is selected is recorded for each pixel in memory to be output as part of the pixel reading.

Devices of this invention are not limited to three transistor or four transistor pixel structures (i.e. "3T" and "4T" pixels) as pixel designs within the scope of the present invention may share transistors and additional transistors may be used for variants in pixel design and for functions such as blooming control. Also, the current invention utilizes a capability to begin integration periods for individual pixels on a selective basis and this feature is best implemented by the addition of a transistor to the respective pixel structure. For the 3T design, a transistor is preferably added so that coincident row and column (coincident parallel addressable group and pixel within the parallel addressable group) selections are required to initiate reset of a pixel. For the 4T pixel the same selective coincidence is preferred, but selective operation of the transfer gate for individually selected pixels is preferred to direct selective operation of the reset transistor or transistors for individually selected pixels.

The 4T pixel typically includes a pinned photodiode or other light sensitive device such as a photo-gate structure and with either structure, the light sensitive device is configured to accumulate charge in response to light which strikes it. This accumulated charge will be referred to as light induced charge. In addition to the photo-sensor a second site often referred to as a floating diffusion is also provided. The pixel structure also normally includes a first transistor to reset the floating diffusion to a specified potential (normally its highest operating potential), a second transistor which is connected in a source follower configuration to serve as a buffer amplifier to provide a lower impedance output which tracks the voltage on the floating diffusion, a third transistor to connect and thereby multiplex the buffered pixel output to an output sensing line, and a fourth transistor normally referred to as the transfer gate which is switched to its conductive state to transfer light induced charge from the pinned photodiode (or other light sensing structure) to the floating diffusion. With the transfer gate in its non-conductive state, the reset transistor may be used to reset only the floating diffusion and with the transfer gate in the conducting state, operation of the reset transistor resets both the floating diffusion and the photodiode (or other light sensing structure).

Several features of the 4T pixel present both challenges and opportunities for use in the high dynamic range structure. Some of these features and design options will be discussed here. First, the pinned photodiode structure used in many 4T pixel designs exhibits very low dark current as long as the transfer gate is maintained in the non-conducting state to confine the light induced charge to the junction of the pinned photodiode. Second, the transfer gate provides the option to first reset the floating diffusion and sample the pixel output to obtain a zero reference level and thereafter (preferably very shortly thereafter) to switch the transfer gate in the pixel being read to its conducting state to transfer the light induced charge from the pinned photodiode (or other light sensitive device) to the floating diffusion and then to sample the pixel output. Then the sampled reset level may be subtracted from the sampled pixel reading to correct for offset errors in the readout chain including errors in the reset level on the floating diffusion. This is known as correlated double sampling. Correlated double sampling is not available in a conveniently usable form for imagers having conventional 3T pixels. The low dark current of the pinned photodiode and the low noise level provided by correlated double sampling are particularly beneficial in providing enhanced performance at low light levels. Nondestructive readout of the pinned photodiode (or other light sensitive device) may be provided by continued or repeated switching of the transfer gate to its conductive state to transfer additional light induced charge to the floating diffusion, but in general this results in higher effective dark current and may also prevent practical use of correlated double sampling to reduce readout noise. For these reasons, preferably non-digitized sample readings of the light level are preferably taken and compared to threshold values to determine the integration period to use for each pixel prior to initiation of the selected integration for the pixel. A selectable integration period is preferably chosen for each pixel just prior to initiation of the selectable integration period for the pixel and once initiated, it is preferable that the selected integration period is carried to completion and that normal correlated double sampling is provided at least in reading of the pixel value which is used to provide the digitized output value.

It is preferable to also use correlated double sampling for the sample readings made to select the appropriate integration period. In a preferred configuration which is used as an example, all selectable integration periods for a pixel are initiated so that they end at the same time so that selective initiation of longer integration periods is scheduled before selective initiation of shorter integration periods for a pixel. Within an image acquisition sequence, time is provided to take a sample reading to determine whether or not to select the longest of the available integration periods and the time required to take this sample reading plus the time for the longest integration period are sized to fit in the longest time interval which is available to acquire the image. A single sample reading may optionally be used to determine whether to select more than one of the selectable integration periods; but, for a given design it may be preferable to provide a separate sample reading to be used in conditional selection of each selectable integration period for a given pixel of the array beginning with conditional selection of the longest integration period and continuing for conditional selection of each successively shorter selectable integration period until an integration period is selected for the particular pixel and the particular image. After the integration period is selected, an indication of the integration period selected for the pixel for acquisition of the particular image is recorded and the selected integration period is initiated and allowed to continue to completion. At the conclusion of the integration period for the pixel, the pixel value is read, preferably using correlated double sampling and preferably digitized and output along with an indication of the integration period used to acquire the reading. The imager is preferably configured to perform the stated sequence of operations on every active pixel of the array for acquisition of an image and the entire sequence is preferably performed for every active pixel for every image which is acquired.

The above indicates the majority of operational adjustments needed to provide a series of selectable integration periods for each pixel so that except as noted, most of the other operational details may be very similar to those described elsewhere herein. Notable features to characterize the imager with multiple selectable integration periods, selectable for each pixel, to operate with the 4T pixel are summarized below. Rather than effecting selection of an integration period by reading the pixel value after partial integration to determine if a shorter integration period should be selected and performing a selective reset operation to conditionally initiate, a new, shorter integration period, a sample reading is taken with the pixel and the decision to initiate a particular integration period is preferably at least partially based on a comparison of the sample reading from the pixel against a threshold value. With this arrangement, time must be allocated for a sample reading on which to base the decision to initiate the longest integration period and additional sample readings used to determine whether to initiate particular ones of the shorter selectable integration periods are preferably performed during the time allocated to perform the longest integration period for the pixel. By default if the light level is so high that none of the integration periods longer than the shortest of the selectable integration periods is selected, the shortest selectable integration period will be selected and initiated by default. Thus, it is preferable to initialize the memory indication of the currently active integration period for the pixel to indicate the shortest integration period at the beginning of the image acquisition sequence for the pixel and to use this value to indicate that no longer integration period is in progress for the pixel. The indication of the shortest integration period for the pixel is preferably overwritten with the indication of the selected integration period at any point in the sequence at which a longer integration period is selected and initiated for the pixel. This is roughly the reverse of the sequence used for other embodiments described herein, where initiation of a shorter integration period was performed by resetting a longer integration period which was in progress. In at least one embodiment described elsewhere herein, the pixel is preferably initialized by beginning the longest integration period and by setting the associated memory to indicate that the longest integration is in progress and then using a reset to interrupt the longer integration period and also updating the associated memory indication of the integration in progress to start a shorter selectable integration period. With the reset sequence, when a pixel which is not reset for the next longer integration period, the pixel is preferably allowed to integrate without further resets until readout. With the sample reading and pre-selection of the integration period for the present embodiment, further sample readings and initiation of any shorter integration periods are preferably suppressed for a pixel prior to readout whenever the indicated integration period has been changed from its initialization setting to indicate a longer integration period which has been selected and is in progress for the pixel. Instead of providing the capability to select reset of a pixel at the individual pixel level, the pixel level selection is preferably provided for switching of the transfer gate to it conductive state within the pixel. The pixel is then selectively reset as noted above by switching the transfer gate to its conductive state (In this case, on a pixel level selective basis) and also operating the reset node. Selective operation of the pixel transfer gates to selectively switch the transfer gates to their conductive states permits pixels for which integrations are in progress to continue undisturbed by selectively maintaining their transfer gates in the non-conductive state while the integrations are in progress.

As an option, the 4T pixel may be used in a way which is very similar to the 3T pixel by using continued or repeated switching of the transfer gate to its conductive state to transfer charge from the pixel light sensing structure to the readout node to enable nondestructive readout to sample the pixel value and to enable the use of selective reset to operate the pixel in a manner that may be directly used in the design which is detailed as an example elsewhere herein.

The discussion which follows is somewhat complex because it describes a fortuitous combination of design features which overcome several potential problems in practical application of the invention while providing for a structure which provides a very wide dynamic range with good resolution throughout a major portion of the wide dynamic range and at the same time permits the use of a floating diffusion which has a low capacitance relative to the capacitance of the light sensing structure to provide a high sensitivity in terms of volts per lux second at the pixel level in combination with true correlated double sampling to enable near optimal performance of the 4T pixel structure for low light level applications. In what follows, several of the design balance problems will be outlined and then the design with the fortuitous combination of features to minimize these problems will be presented.

First, in a usual presentation of properties of a 4T pixel with a pinned photodiode, it is noted that the transfer gate is preferably set to its non-conducting state during the integration period so that light induced charge accumulates in the capacitive well which is inherent to the pinned photodiode. Then, at the end of the integration period and preferably just after resetting the floating diffusion and reading the reset level of the reference node for the correlated double sampling, the transfer gate is switched to its conductive state to transfer light induced charge from the photodiode to the floating diffusion and this value is read. The floating diffusion is designed to have a lower potential than the storage region of the pinned photodiode structure so that when the transfer gate in the pixel is switched to its conducting state the first increments of charge will flow from the photodiode to the floating diffusion and the voltage increment created by the charge will change in inverse proportion to the capacitance of the floating diffusion relative to the capacitance of the photodiode. When there is enough charge that the potential in the floating diffusion exceeds the potential of the photodiode storage well when it is empty, this excess charge will flow to equalize the voltage on the photodiode and the floating diffusion so that increased increments of charge will fill the combined capacitance of the floating diffusion and the photodiode resulting in a knee in the response curve of floating diffusion voltage vs. light induced charge and a change from a higher to a substantially lower slope. The point that will be significant in the design is that that measurable and usable response to increased charge extends into this lower slope region and response in this region of lower responsivity will be used to extend the integration period which may be used to sample the light level at the pixel to determine what integration period to use for the pixel. By providing a pixel with a floating diffusion which has a capacitance which is small relative to the capacitance of the photodiode, a relatively noise free voltage amplification of the signal due to light induced charge is achieved at the pixel level. The low noise characteristic of this amplification and the voltage amplification directly at pixel are very beneficial to extend the response of the pixel to adequately respond to low light levels with a given integration period. The dilemma in the prior art designs which depend on a single integration period for all pixels in the imager to cover the entire illumination range in the image is that the choice of a small capacitance for the floating diffusion node very significantly lowers the amount of light induced charge for which readout is linear limiting the usable linear dynamic range. The selection of one of multiple integration ranges for each pixel as provided by this invention greatly reduces the need to linearly capture as large a dynamic range for a given integration period.

Second, as noted previously, use of nondestructive readout compromises operation of the 4T pixel so it is preferable to separately monitor or to pre-sample the light level to which each pixel is exposed during each image acquisition period in order to select the integration period appropriate for the pixel. The embodiment described here takes a sample reading or readings from the pixel itself prior to initiation of the integration period for the pixel reading to provide one or more pre-samples of the pixel reading on which to base the selection of the integration period for the pixel. The challenge is to create a structure which provides time to initiate and read these pre-samples and to schedule these sample readings so they are timely and convenient to act upon. Although the invention is not limited to implementation of a specific choice of the relative sizes of the integration periods, for the sake of clarity, it will be assumed that there are eight available integration periods starting with the longest and with each successive additional integration period being one fourth of the length or preferably of a length which provides one fourth of the sensitivity of the next longer integration period.

In at least one embodiment an imaging device is configured to utilize characteristics of the 4T pixel or other pixel structure which has similarities to the 4T pixel in its operating characteristics. In the present example, a sample reading is taken just prior to conditional initiation of the longest selectable integration period and an additional sample reading will be taken prior to each successively shorter selectable integration period until an integration period is selected and initiated for the pixel or none of the integration periods longer than the shortest have been initiated in which case the shortest selectable integration period is initiated by default and no sample reading is needed. In a preferred implementation, it requires less time to combine initiation of the integration periods for the pre-samples with readout of the pixel for the previous image frame to initiate the integration period for the pre-sample reading to control selection of the longest selectable integration period or with steps to conditionally select the next longer of the integration periods in the remaining cases. As indicated above, integration periods for additional pre-samples after the first are initiated only when an integration period has not been selected for the pixel for capture of the current image and, additionally, a selectable integration period other than the shortest remains as a candidate for selection as the integration period for the pixel for the current image acquisition sequence. Initiation of an integration period for a pixel is performed by resetting the pixel and preferably placing the transfer gate in the pixel in its high impedance state after the reset while an integration period for the pixel, pre-sample or otherwise, is in progress. Pre-sample readings are preferably taken at the beginning of intervals scheduled to make a determination of whether or not to initiate a selectable integration period for the pixel. Each such reading is preferably compared against a threshold and the result of the comparison is used in part to determine whether or not to select the associated integration period for the pixel. The same general organization including the use of at least partially row parallel processing for the comparisons and for selective initiation of selectable integration periods are applicable for this design as they were described elsewhere herein. The comparison thresholds are preferably adjusted to take into account the integration period used for the pre-sample for each of the selectable integration periods, systematic nonlinearities in the reading, and the available readout range for the pixel. The thresholds may be adjusted to take into account expected inaccuracies in readout and time variation in the light sources, these factors being balanced against the desire to avoid saturated pixel readings and the desire to utilize the full scale range of the pixel readout circuits. Here, one should note that with each preceding integration four times longer than its immediate successor and with the integration ending at a time which does not depend on the integration period which is selected, the integration period for each of the pre-sample readings after the first is nominally three times longer than the integration period which is conditionally selected based on the reading. Here, in a preferred design, the readout range for the final pixel value is preferably restricted generally to the linear portion of the output response of the pixel and additional gain may additionally be applied to the pixel value before it is digitized. Additionally, the comparison threshold on which selection of the integration period for the pixel is based may extend into the nonlinear reduced slope region of the pixel readout as outlined above. Any combination of the above may be used to more fully utilize the preferably linear readout range for the pixel while still allowing initiation of the integration periods to be grouped with tasks to initiate a selectable integration period. The forgoing is preferred but is not intended to restrict the invention to use of the linear readout range and additional tasks may be scheduled to read a pre-sample or to initiate the integration period for a pre-sample. Also, the memory used to record an indication of the integration period for a pixel may be used to store an indication of an integration period which is selected and the integration period for the pixel may be initiated in a subsequent task based on the indication stored for the pixel. The memory associated with each pixel to record an indication of the selected integration period may be used in a similar way when a pre-sample is used to choose a possible one of several of the selectable integration periods and/or where one or more pre-samples are obtained and an integration period is selected well before initiation of the task in which it will be initiated. In this way a portion of the selection process for an integration period might even be based in part on the value read for the pixel for the preceding image.

Figure 6:
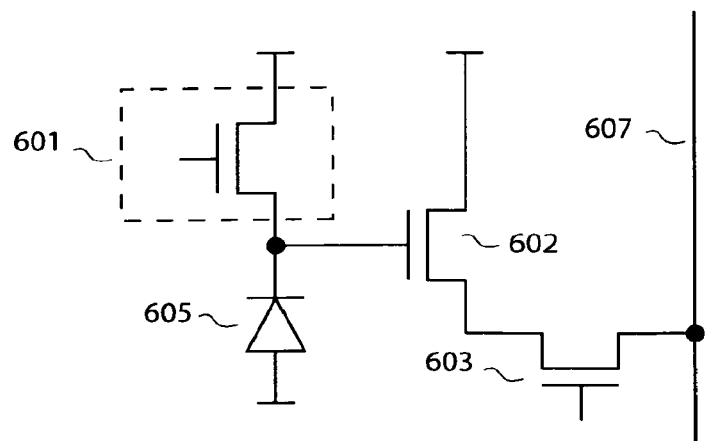
FIG. 6 depicts a simplified schematic representation of a 3T pixel.

FIG. 6 is a simplified schematic representation of a 3T pixel. Reset transistor 601 is switched to its conducting state to charge light sensing photodiode 605 to a reset potential level and is then switched to its non-conducting state to enable a light induced change in the charge stored on photodiode 605 to occur during the integration period. The reset potential is normally set to reverse bias the light sensing photodiode. The light induced change in charge level results in a change in the voltage at the cathode of photodiode 605. Transistor 602 serves as a source follower to buffer and track the voltage on the cathode of photodiode 605. Transistor 603 is switched to its conducting state to connect the buffered pixel photodiode voltage to column line 607 for readout. This pixel structure is well adapted for incorporation in the pixel 516 of FIG. 5. To incorporate the photodiode based 3T pixel of FIG. 6 into the circuit of FIG. 5, logic is preferably provided at the individual pixel level to provide the pixel level selective reset provided in FIG. 5 by block 502 which responds to coincident assertion of prescribed signal levels on lines 503 and 515.

Figure 7:
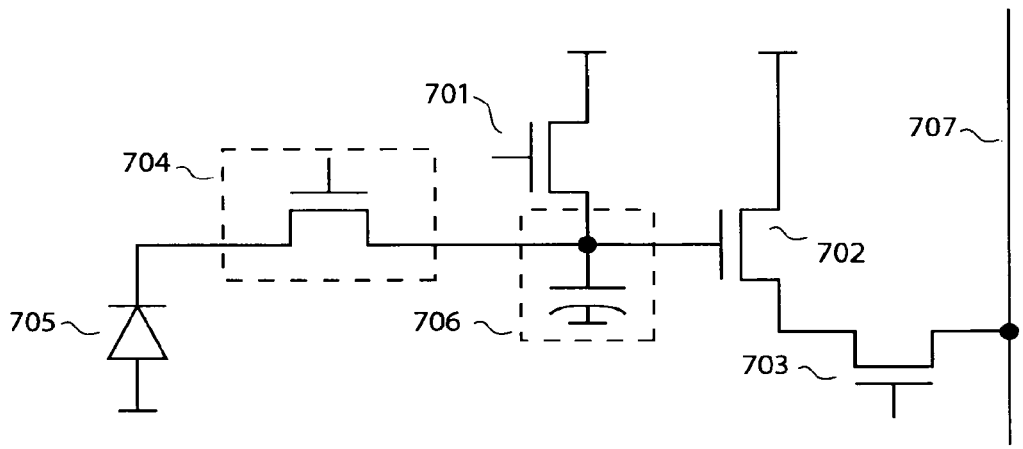
FIG. 7 depicts a simplified schematic representation of a 4T pixel.

FIG. 7 is a simplified schematic representation of a 4T pixel which may be adapted for application in the embodiments of this invention described for applications which include use of the 4T pixel structure. Reset transistor 701 is switched to its conducting state to charge floating diffusion 706 to a reset potential level and is then preferably switched to its non-conducting state prior to taking a reference reading. Then the transfer gate 704 is switched to its conducting state to transfer light induced charge stored on photodiode 705 to the floating diffusion causing a change in the voltage of the floating diffusion which may then be read. The photodiode 705 is preferably reset by switching both transfer gate 704 and reset transistor 701 to their conducting states at the same time and this operation is preferably performed to reset the pixel to begin a new integration period. For readout of the voltage on the floating diffusion, transistor 702 serves as a source follower to buffer and track the voltage on the floating diffusion 706. Transistor 703 is switched to its conducting state to connect the buffered pixel floating diffusion voltage to column line 707 for readout. As noted elsewhere herein, leakage currents at the light collecting photodiode site 705 are normally minimized when the transfer gate 704 is in its non-conducting state.

A reading of the pixel is normally taken by first resetting the pixel and floating diffusion as described above and providing an integration period to collect light induced charge on the photodiode. At the end of the integration period, readout is preferably accomplished by first resetting the floating diffusion node 706 by switching reset transistor 701, preferably momentarily, to its conducting state and back to its non-conducting state and then sampling the reset level of the floating diffusion 706 through the readout chain provided by transistors 702 and 703. Preferably immediately or very shortly after the reset of the floating diffusion and sampling of the reference level and, preferably without further reset of the floating diffusion, the transfer gate 704 is switched to its conducting state, preferably momentarily, to transfer light induced charge from photodiode 705 to floating diffusion 706 and this value is sampled through the same readout chain used to sample the reset level. Following this, the reset level sample reading is preferably used as a zero reference for the sample reading taken after transfer of light induced charge from the photodiode to the floating diffusion. As noted elsewhere herein, the gain or sensitivity at the pixel level may be increased, possibly at the expense of dynamic range, by making the capacitance of the floating diffusion 706 smaller relative to the capacitance of pixel photodiode 705.

To incorporate the pixel structure of FIG. 7 into a device to be used in the present invention, it is preferable to provide operations which are selective at the pixel level. As noted above, with the 3T structure addition of a circuit to provide selective reset is preferred. For the structure of FIG. 7, it is preferable to provide operation of the transfer gate 704 which is selectable at the pixel level. For example, a logic circuit which may include one or more transistors may be added to the pixel structure of FIG. 7 to control application of an electrical signal to the gate of transfer gate transistor 704 in such a way that operation of the transfer gates may be selectively controlled for individual pixels within an addressable group of pixels.

Figure 8:
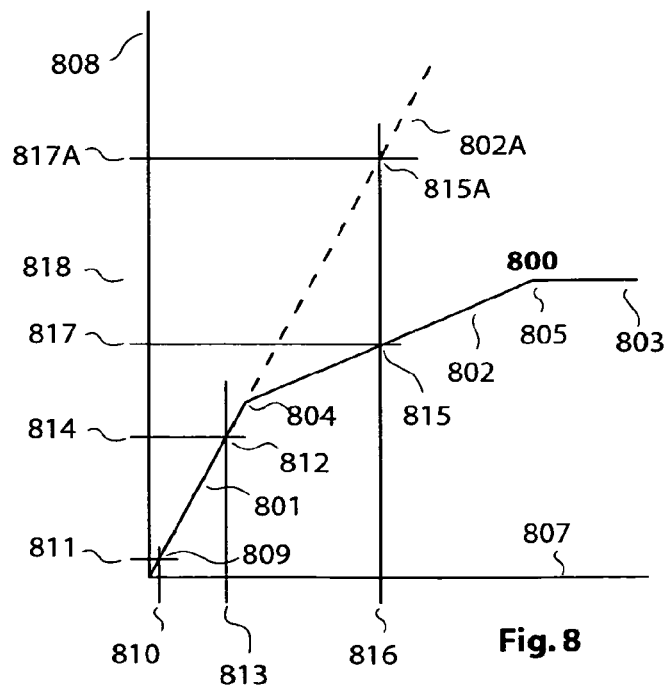
FIG. 8 depicts a dual slope pixel response.

FIG. 8 indicates a dual slope pixel response which may result, dependent on pixel design parameters, in the response of a pixel as depicted in FIG. 7 as integrated pixel charge level for the reading increases. In the illustrations based on FIG. 8 which follow, it is assumed that the light level during a combined pre-sample integration and ensuing integration period for a pixel remains nearly constant. Integrated charge at pixel readout is indicated along axis 807 and pixel response is indicated along axis 808. Curve 800 depicts pixel output response as integrated charge as readout increases. For low levels of integrated charge, charge transfer from the pixel to the floating diffusion is essentially complete resulting in the high slope of portion 801 of curve 800. For higher levels of integrated charge (beyond point 804), the potential on the floating diffusion is high enough (Here the term higher is intended to indicate potential of greater magnitude with a sign chosen so that increasing light induced integrated charge increases the potential on the photo-sensor. Note that this is likely to be the reverse of the sign normally assigned to a potential level). That additional charge does not all empty from the pixel and only a portion is transferred from the pixel to the floating diffusion. This results in the lower slope of portion 802 of curve 800. For higher charge levels which saturate the pixel (beyond point 805), response may substantially saturate resulting in the relatively flat portion 803 of curve 800 and an output level 818. For readout, it is desirable to stay primarily in the linear range 801 of the response curve so that a charge level 813, for example, results in a pixel response 812 and a readout level 814. If the response remained linear, curve 801 would remain linear as indicated by 802A and charge level 816 would result in response level 815A and readout level 817A. Instead, it results in pixel response 815 and output level 817. The illustrative levels have been chosen so that light induced integrated charge level 810 with response 809 and readout value 811 is from an integration period that is nominally one eighth of the integration period which creates light induced integrated charge level 813 with response 812 and readout value 814 and light induced integrated charge level 813 is from an integration period that is nominally one third of the integration period which creates light induced integrated charge level 816 with response 815 and readout value 817. For example, for the pixel response which is depicted, integrated charge level 813 may correspond to the level targeted for the full scale range selection threshold level for an integration period selected for a pixel reading. Then output level 811 resulting from integrated charge level 810 may represent a corresponding threshold level for an initial pre-sample for which the integration period of the pre-sample is set to one eighth of the selectable integration period (This is an example and other pre-sample integration periods may be selected). which is selected based on the pre-sample reading. Similarly, the output level 817 resulting from integrated charge level 816 may represent the corresponding threshold level of pre-samples for a subsequent integration period which may, for example, be nominally three times as long as the integration period which is conditionally selected based on the pixel reading for the pre-sample. For an integration period selected on the basis of a pre-sample having one eighth of the duration of the integration period whose selection is based on the pre-sample reading, the selection criteria may be to select and initiate the integration period if the pre-sample reading is less than the value indicated at 811 and to proceed to select a shorter integration period if the pre-sample reading is greater than the value indicated at 811. Here the threshold value 811 for the pre-sample period corresponds to the level 814 for the conditionally selected integration period as illustrated above. For an integration period selected on the basis of a pre-sample having three times the duration of the integration period whose selection is based on the pre-sample reading, the selection criteria may be to select and initiate the integration period if the pre-sample reading is less than the value indicated at 817 and to proceed to select a shorter integration period if the pre-sample reading is greater than the value indicated at 817. Here the threshold value 817 for the pre-sample period corresponds to the level 814 for the conditionally selected integration period as illustrated above.

This example illustrates the preferable choice of the threshold level 817 based on the nonlinear response of the pixel as opposed to use of level 817A which would be chosen for a pixel with an extended linear response. It also illustrates choice of a response threshold which is scaled to account for the relative lengths of the integration time for the pre-sample relative to the integration time for the integration period selected based on the sample reading. In each case, the range selection threshold level in the pre-sample is selected so that it corresponds to the desired full scale range selection threshold level for the integration period whose selection is based on the pre-sample. Many pixel designs do not exhibit the extended range of lower slope as depicted by 802 in the example and as one option for such pixels, to utilize the available readout selected based on the pre-sample with the longer integration period, gain may be provided for the pixel value prior to or during A/D conversion to achieve a desired readout range. Also, additional resets may be used to provide shorter pre-sample integration periods. In any case, it is preferable to select threshold values which are appreciably below the saturation level 818 to avoid selection of an integration period for which the reading is likely to saturate. Use of the options just enumerated is considered to be within the scope of the invention.

As indicated elsewhere in this document, for some pixel structures either the pixel value itself (or a related value which is indicative of the light induced charge accumulated on the pixel) may be read nondestructively. For such pixels, it is convenient to sample the pixel value on a prescribed schedule after partial integration and to use the sampled readings to determine when to begin shorter integration periods from a group of selectable integration periods. Pixel reset is typically used to begin a shorter integration period and for pixels for which readout is non-destructive, a longer integration period which is in progress may be permitted to continue by simply not performing the reset operation. Some pixel structures are not at all amenable to nondestructive readout and, for certain other pixels, nondestructive readout may be possible but its use may compromise pixel performance. (In the above, destructive readout is used to indicate that readout of a pixel disrupts the reading in a way that makes it impractical to resume or continue integration to extend the integration period for the reading which is in progress and is not intended to mean that the pixel is physically damaged or destroyed). This is often the case, for example, with pixel structures commonly referred to as 4T (four transistor) pixel structures. As explained elsewhere, one option to practice this invention using these pixels without requiring nondestructive readout is to take pre-sample readings with a pixel before committing to an integration period for the pixel and to use these pre-sample readings to at least in part determine whether or not to initiate and commit to a particular integration period for the pixel. With this arrangement, it is preferable to maintain a record of whether an integration period is selected and also of which is selected when a particular integration period is selected and initiated for a given pixel. It is also preferable to initiate the selectable integration period for each pixel so that it ends at a time which does not depend on which integration period was selected. It is preferable, that the indication of what integration period is in progress is initialized to a value which indicates that the associated pixel is not yet committed to a particular integration period at the beginning of the image acquisition period for the pixel or at least prior to conditional initiation of pre-samples for integration periods which are shorter than the longest. This indication is preferably used to determine when to continue operations on the pixel prior to selection and initiation of an integration period for the pixel to select an integration period for the pixel. Once an integration period is selected and recorded for the pixel, the integration is preferably initiated and permitted to continue, uninterrupted, to completion; the updated indication of the integration period selected being used to inhibit further operations on the pixel which would interfere with the integration which is in progress for the pixel. At the pixel level, to enable selection and initiation of integration periods which are selectable at the pixel level, it is preferable to introduce the mechanism for selective control at a point which is close to the light sensing element in the pixel. For a usual 4T pixel structure, a pinned photodiode is the light sensing device and the transfer gate is the device which provides the primary control mechanism to selectively isolate or connect the photodiode to the readout and reset mechanisms in the pixel. Thus, it is preferable to provide transfer gate functionality which is selectable on a pixel by pixel basis and to use this capability to reset pixels selectively at the appropriate time to initiate the selected integration period and to provide the additional capability to isolate the pixel from operations such as reset of the floating diffusion in the pixel which would otherwise be disruptive to a readout which is in progress. Both the pixel level selection of the photodiode reset by selectively closing the transfer gate and the pixel level selection of the isolation from other operations in the pixel by selectively inhibiting closure of the transfer gate are utilized in the preferred structure in order to initiate integration at the pixel selective level and to selectively shield the pixel from operations which include other pixels in the same parallel addressable group. If the reset of the floating diffusion was provided at the pixel level, operation of the transfer gate while integration is in progress would continue to be disruptive for modes of operation including correlated double sampling and provision of selective operation at the pixel level for both the reset and the transfer gate functions would add complexity to the pixel. Except for the addition of the pre-sample acquisition and associated changes in the logic and in pixel control structure, other aspects of the scheduling of tasks and of pixel readout including the use of parallel task execution, use of encoding techniques to communicate the high dynamic range in the pixel output data, use of a predetermined set of selectable integration periods, etc., may be very similar to those used with pixels for which readout is non-destructive. Closure of the transfer gate is used herein to mean that the transfer gate is switched to its conductive state and opening the transfer gate is used to mean that the transfer gate is switched to its non-conductive state.

In order to directly map the indication of the selected integration period into the exponent of an output value for the pixel, it is preferable to assign the highest index to the shortest selectable integration period and to assign successively lower index values to successively longer selectable integration periods. Thus, it is preferable to initialize the indication of the integration period to its highest value and use this as the indication during the image acquisition interval for the pixel that a longer integration has not been selected for the pixel.

Figure 9:
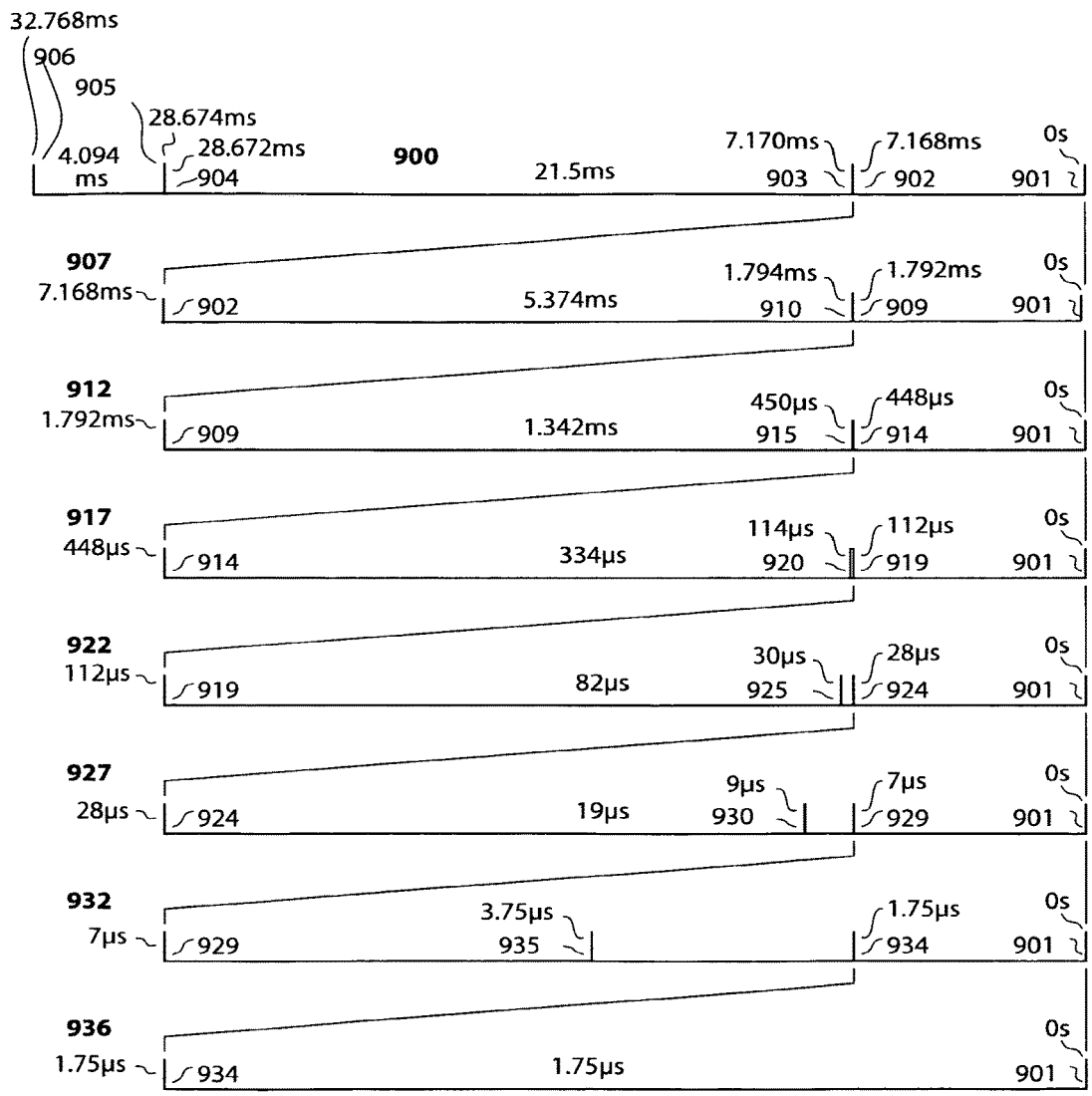
FIG. 9 depicts a detailed outline of timing for making a determination of what integration period to select for a pixel.

In FIG. 9 a detailed outline of timing for making a determination of what integration period to select for a pixel is given as an example. For the example in FIG. 9, a procedure which is preferred but not required to practice the invention is followed whereby a pre-sample reading is taken prior to each selectable integration period except the shortest until an integration period is selected for the pixel. Integration periods are initiated both to acquire pre-sample readings and to acquire a pixel reading using the selected integration period. Each integration period for a pre-sample is preferably initiated in a task sequencing period during which at least one other task is performed for the pixel to reduce the number of tasks which must be separately scheduled. Performance of these tasks normally includes parallel addressable group selection and access to the memory associated with each pixel being operated upon so grouping the reset to begin the integration period for the pre-sample with other tasks for the pixel is not only a convenience but also reduces the need to repeat required parallel addressable group selection and memory access operations. This may not be practical for all pre-sample periods but saves processing overhead for each pre-sample integration period which is initiated in a task sequencing period during which other tasks are performed. At the conclusion of the integration period for the pre-sample, some or all of the following tasks are preferably accomplished within a single task sequencing period: These tasks include determination if a readout is in progress for the pixel, and if not, readout of the pre-sample value, and determination of whether to select the integration period and initiate integration for pixel readout or to initiate integration for another pre-sample; initiation, as needed, of an integration period for the newly initiated readout operation or for the next pre-sample; and update of the record of the integration period selected for the pixel when a new integration period for pixel readout is initiated. Similar tasks are preferably performed, at least partially in parallel for other active pixels in the addressed parallel addressable group.

Refer to FIG. 9 which depicts a timing schedule for exemplary operations on an individual pixel to acquire the pixel reading. The pixel is preferably a member of a group of pixels which are preferably organized in parallel addressable groups with at least partially parallel operations being utilized to perform similar operations, preferably on each active pixel of the currently selected parallel addressable group. During the acquisition sequence each operation is preferably performed on each active pixel in each parallel addressable group which contains active pixels to preferably perform the set of operations on every active pixel in the imager for each image acquired. A rolling shutter timing cadence is preferably employed to acquire the image. 900 depicts the full 32.768 millisecond image acquisition period for the pixel; 907 details the last 7.168 milliseconds of the period 900; 912 details the last 1.792 milliseconds of the period 907; 917 details the last 448 microseconds of the period 912; 922 details the last 112 microseconds of the period 917; 927 details the last 28 microseconds of the period 922; 932 details the last 7 microseconds of the period 927; and 936 details the last 1.75 microseconds of the period 932.

At 906, the pixel reading acquisition sequence for the individual pixel begins with initialization of the memory item indicative of the integration period used for the pixel preferably to the index associated with the default shortest integration period to indicate that, at this point, an integration period has not been selected for the pixel, and the pixel is reset to initiate a 4.094 millisecond pre-sample integration period which extends to 905 at which point, the pixel value is read, preferably in analog form and the pixel reading is compared with a value which is pre-selected for conditional selection of the longest 28.762 millisecond integration period based on the pre-sample whose integration period is only one eighth as long as the integration period to be conditionally selected based on the comparison. If the pixel pre-sample reading is less than the threshold value, the 28.672 millisecond integration period is selected for the pixel reading and the memory associated with the pixel is updated to indicate selection of the longest, 28.672 millisecond integration period. Then the pixel is unconditionally reset to begin either the 28.672 millisecond integration period for the pixel reading or the integration period for the next 21.5 millisecond pre-sample otherwise. At 904, nominally 2 microseconds after reading of the pre-sample value, the reset is released to begin the integration period.

At 903, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is nominally one third of the duration of the integration period used for the pre-sample. If the pixel pre-sample reading is taken and is less than the threshold value, the associated memory is updated to indicate selection of the 7.168 millisecond integration period and the pixel is reset to begin the 7.168 millisecond integration period for the pixel reading. If the pixel pre-sample reading is taken and the pixel reading is greater than or equal to the threshold value, the pixel is reset to begin the integration period for the next 5.374 millisecond pre-sample. The same reset operation may be used for either case above when the pre-sample value for the pixel has been read and the new integration, in either case, begins at 902, nominally 2 microseconds after reading of the pre-sample value.

At 910, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is nominally one third of the duration of the integration period used for the pre-sample. If the pixel pre-sample reading is taken and is less than the threshold value, the associated memory is updated to indicate selection of the 1.792 millisecond integration period and the pixel is reset to begin the 1.792 millisecond integration period for the pixel reading. If the pixel pre-sample reading is taken and the pixel reading is greater than or equal to the threshold value, the pixel is reset to begin the integration period for the next 1.347 millisecond pre-sample. The same reset operation may be used for either case above when the pre-sample value for the pixel has been read and the new integration, in either case, begins at 909, nominally 2 microseconds after reading of the pre-sample value.

At 915, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is nominally one third of the duration of the integration period used for the pre-sample. If the pixel pre-sample reading is taken and is less than the threshold value, the associated memory is updated to indicate selection of the 448 microsecond integration period and the pixel is reset to begin the 448 microsecond integration period for the pixel reading. If the pixel pre-sample reading is taken and the pixel reading is greater than or equal to the threshold value, the pixel is reset to begin the integration period for the next 334 microsecond pre-sample. The same reset operation may be used for either case above when the pre-sample value for the pixel has been read and the new integration, in either case, begins at 914, nominally 2 microseconds after reading of the pre-sample value.

At 920, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is nominally one third of the duration of the integration period used for the pre-sample. If the pixel pre-sample reading is taken and is less than the threshold value, the associated memory is updated to indicate selection of the 112 microsecond integration period and the pixel is reset to begin the 112 microsecond integration period for the pixel reading. If the pixel pre-sample reading is taken and the pixel reading is greater than or equal to the threshold value, the pixel is reset to begin the integration period for the next 82 microsecond pre-sample. The same reset operation may be used for either case above when the pre-sample value for the pixel has been read and the new integration, in either case, begins at 919, nominally 2 microseconds after reading of the pre-sample value.

At 925, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is a little more than one third of the duration of the integration period used for the pre-sample. If the pixel pre-sample reading is taken and is less than the threshold value, the associated memory is updated to indicate selection of the 28 microsecond integration period and the pixel is reset to begin the 28 microsecond integration period for the pixel reading. If the pixel pre-sample reading is taken and the pixel reading is greater than or equal to the threshold value, the pixel is reset to begin the integration period for the next 19 microsecond pre-sample. The same reset operation may be used for either case above when the pre-sample value for the pixel has been read and the new integration, in either case, begins at 924, nominally 2 microseconds after reading of the pre-sample value.

At 930, the memory indication of the integration period selected for the pixel is read and if it is set to a value other than that which indicates that no integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. When a reading is not in progress for the pixel, the pre-sample value is read and compared against a threshold pre-selected for conditional selection of an integration period for pixel readout which is a little less than three eighths of the duration of the integration period used for the pre-sample. If the pixel pre-sample reading is taken and is less than the threshold value, the associated memory is updated to indicate selection of the 7 microsecond integration period and the pixel is reset to begin the 7 microsecond integration period for the pixel reading. If the pixel pre-sample reading is taken and the pixel reading is greater than or equal to the threshold value, the pixel will be set to the shortest 1.75 microsecond integration period. Following the initial, preferably shorter integration period used for the pre-sample on which to base conditional selection of the longest of the selectable integration periods, tasks to initiate the pre-sample integration periods and to read the results and to conditionally initiate the associated selectable integration period followed a repetitive pattern up to this point. In the task sequencing interval which extends from 930 to 929, if no longer integration period has been selected and the 7 microsecond integration period is not selected, only the 1.75 microsecond integration period remains and when no shorter selectable integration periods remain, it is preferably initiated by default, so a pre-sample integration period does not need to be initiated in the interval from 930 to 929 but performance of the reset should not have harmful consequences and may be beneficial to drain light induced charge from the pixel and to eliminate the need to add logic to inhibit the reset.

At 935, the memory indication of the integration period selected for the pixel is read and if it is set to a value other than that which indicates that no longer integration period has been selected, reading of the pixel and operations which affect the integrated charge on the pixel are suppressed, preferably by holding the transfer gate in the pixel in its nonconductive state so that other actions performed on the pixel during the task period do not have a substantial effect on the reading which is in progress. If no longer integration period has been selected, the following actions are taken to initiate the shortest 1.75 microsecond integration period. The indication of the integration period which is set, if not already initialized to indicate the 1.75 microsecond integration period, is set to indicate this value and the pixel is reset and the reset released to begin the 1.75 microsecond integration period at 934.

At 901 the pixel value is read along with the indication from memory of the integration period used for the reading. The pixel read operation at 901 is preferably part of a parallel operation performed on pixels of the row or parallel addressable group. Then in an ensuing set of operations which may be serialized for pixels of the row or parallel addressable group, the pixel value is preferably digitized, preferably for the first time in the pixel reading image acquisition sequence, and preferably combined with the indication of the integration period used to give an indication of the light level at the pixel.

In the above, the processing time in the task sequencing interval during which no integration is taking place (nominally 2 microseconds in the example above) reduces the duration of the integration periods for the pre-samples having progressively more effect on the duration of the pre-sample integration period relative to the integration period whose selection is based on the pre-sample as the pre-sample integration period becomes shorter. It is preferable to take this and other integration period related effects into account to set the compare threshold value used for each of the pre-sample integration periods.

Each selectable integration period is initiated to end at time 901 so that the pixel reading is scheduled to take place at 901 without regard for which integration period is selected and when the integrated pixel value is read at 901, the indication of the integration period used for the pixel is also read in a synchronized manner and communicated as part of the pixel readout value. The same considerations presented earlier with regard to options to use floating point or various encoding options for pixel value readout apply to this embodiment also.

Figure 10:
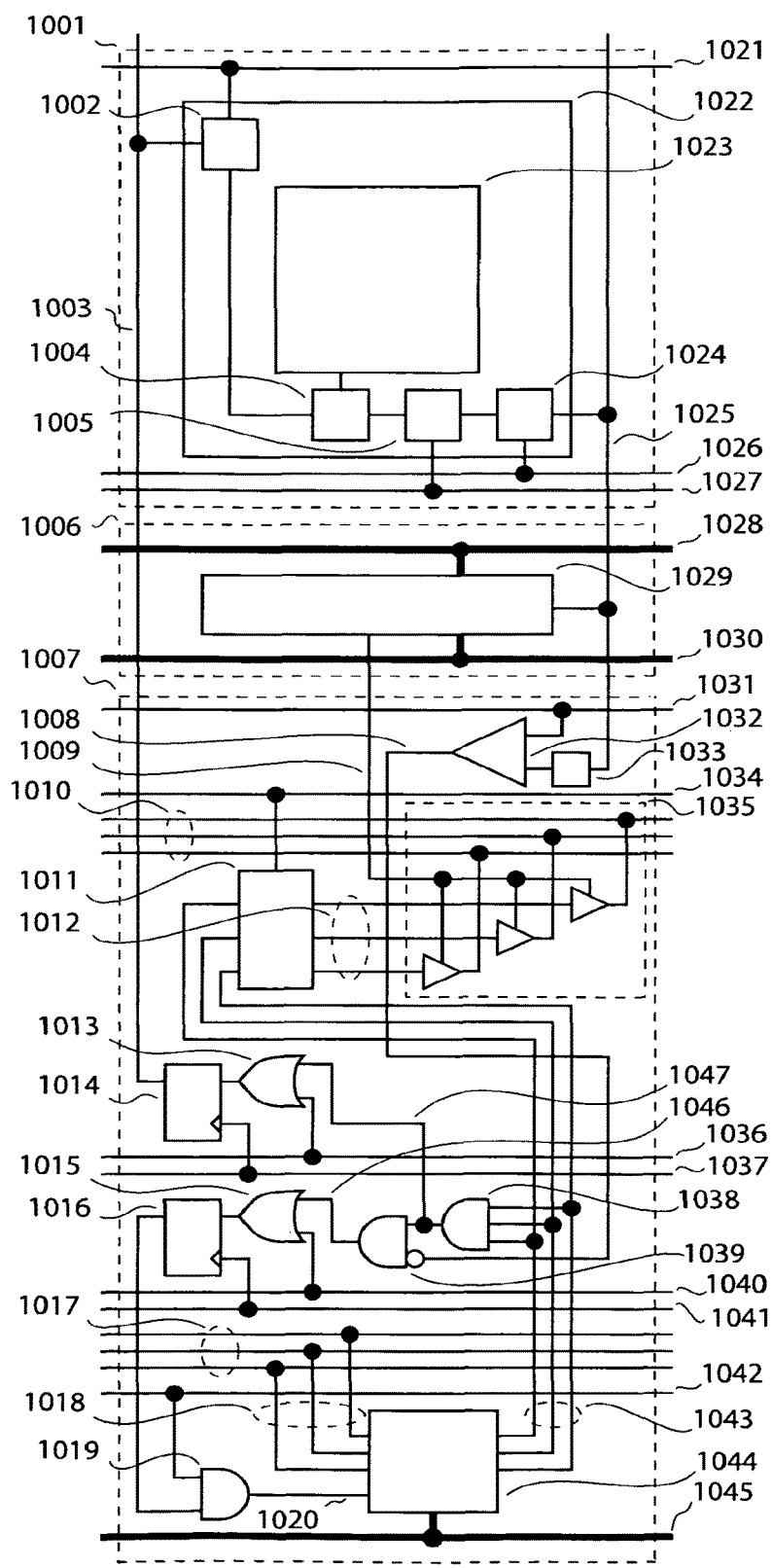
FIG. 10 depicts a simplified diagram of the column logic.

FIG. 10 is a simplified diagram of the column logic which is preferably replicated for each column which has active pixels in the imaging device so that many of the operations described may preferably be performed in parallel for active pixels in a row or parallel addressable group. The structure and many of the features are similar to those of FIG. 5 except that the structure of FIG. 10 is intended for use with a pixel such as a 4T pixel and is configured to acquire pre-sample readings from each pixel just prior to conditional selection of an integration period for the pixel, with the conditional selection of the integration period preferably being based at least in part on the value of the pre-sample reading for the pixel. When a given integration period is not conditionally selected for a pixel, an integration period for a shorter additional pre-sample is preferably initiated and the sequence above iterated for conditional selection of remaining shorter selectable integration periods until an integration period is selected or until only the shortest of the selectable integration periods remains, in which case, it is preferably initiated by default. Initiation of an integration period preferably includes reset of the pixel to begin the integration period and recording of an indication of the integration period initiated in a memory item associated with the pixel. In this configuration, pixel values need to be read only after completion of intended integration periods enabling application of the configuration to pixel structures for which readout of the pixel value before completion of the integration period is problematic. The logic block of FIG. 10 associated with a column of pixels is preferably laid out to fit in a space equal to the width of the associated column of pixels so that similar logic blocks may be provided for each column of pixels and aligned with their respective associated columns of pixels.

Pixel 1001 is one representative pixel from the column of pixels which is served by the logic depicted in blocks 1006 and 1007 in FIG. 10. In the full array it is intended that the logic blocks 1006 and 1007 in FIG. 10 is associated with the large number of pixels in the associated column of pixels, preferably including one pixel for each row or parallel addressable group of pixels in the array. Signal lines 1021, 1026, and 1027 are associated with the row or parallel addressable group to which pixel 1001 belongs and signals on these lines are used to selectively manipulate pixel 1001. Other pixels in the column are each selectively manipulated by signal lines dedicated to the particular row or parallel addressable group to which the pixel belongs. In FIG. 10, the signal lines provided separately for each pixel in the column include row transfer gate control line 1021 which is used in selective control of the transfer gate, row select line 1026 which is used to control connection of the pixel output to the column line 1025 for readout, and row reset line 1027 which is used to control reset of the floating diffusion (and pixel when the transfer gate is conducting). Different select, reset, and row or parallel addressable group oriented transfer gate control lines are provided for each pixel in the column and each of these signals preferably extends to other pixels in the associated row or parallel addressable group. Further, it is preferred that logic similar to that depicted in FIG. 10 is provided for every column of pixels in the imaging array. The pixel 1001 and others like it in the array may be based on a conventional 4T pixel with the functionality of block 1002 being added to provide switching of the transfer gate to its conductive state which is selective on a pixel by pixel basis. In typical prior art devices, the transfer gate in each pixel is switched to and from its conductive state simultaneously for every pixel in a selected row and the capability to selectively operate the transfer gate for individual pixels within a row is not provided. Block 1023 represents the light sensing element, preferably a pinned photodiode; block 1004 represents a transfer gate; block 1005 represents a floating diffusion and reset transistor; and block 1024 represents a buffer amplifier and analog switch transistor to connect the buffered pixel output to column line 1025. The pixel structure is preferably similar to that described in FIG. 7 with block 1002 added to provide selective operation of the transfer gate.

In the array of pixels and row of column logic circuits of which logic in combined blocks 1006 and 1007 constitutes the logic circuits for one representation column, column transfer gate control line 1003 and column readout line 1025 serve all of the pixels in the column. Signals 1021, 1026, and 1027 and similar lines for each additional pixel in the column preferably serve all the pixels in a row or parallel addressable group. Lines or buses 1010, 1017, 1028, 1030, 1031, 1034, 1036, 1037, 1040, 1041, 1042, and 1045 preferably serve all of the column blocks similar to 1006 and 1007 in the array.

In the memory 1044 in FIG. 10, three bits are provided for each pixel of the column. This memory is used to store an indication of the integration period selected for each pixel in the column and provides just enough memory to identify one of eight selectable integration periods for each pixel. In a preferred design, the longest selectable integration period is identified by the lowest numbered identifying index and successively shorter selectable integration periods are identified by successively greater index values with the shortest selectable integration period preferably identified by an index value of all ones. In a preferred design, as indicated in the description of the sequence in FIG. 9, the identifying index is initialized to all ones to identify the shortest integration period at the beginning of the image acquisition sequence for the pixel and when a longer integration period is selected and initiated for a pixel, the integration period identifying index value for the pixel is changed to indicate the integration period just initiated. For these operations the index value to be written or conditionally written is communicated on bus 1017 and the row or parallel addressable group address which identifies the selected parallel addressable group (also the selected row in this example) to which the pixel belongs is communicated on bus 1045. Flip-flop 1016 is set either conditionally as will be described or unconditionally by asserting a true signal on line 1040 and clocking line 1041 to register the memory update enable indication in the flip-flop. When the memory update enable flip-flop 1016 is set, the value asserted on bus 1017 is written into the addressed 3 bit memory location associated with the selected pixel in the column. A new value is written into the 3 bit memory location associated with the pixel when the update indication from flip-flop 1016 is true and the memory write pulse is asserted on line 1042. Gate 1019 "ands" the two write conditions together to provide the memory write strobe 1020. The addressed 3 bit indication associated with the selected pixel is output from memory 1044 on local bus 1043 and communicated to 3 bit buffer memory 1011 where it is stored temporarily in response to a pulse on line 1034 during the parallel phase of the row readout and output on lines 1012. During the pixel by pixel phase of the row readout, a signal is asserted on select line 1009 to enable buffers 1035 to output the identifying index of the integration period used for the reading on bus 1010 so that it is synchronized with digitization of the pixel value and included in the readout of the pixel value. Block 1029 includes column logic similar to that provided in prior art devices to sample pixel readout values and zero reference values during a preferably row or parallel addressable group parallel read operation and hold and communicate them at the appropriate time for conversion and readout which may be provided sequentially a pixel at a time and which may overlap operations performed by other column logic depicted in FIG. 10 which is used to select and initiate the appropriate one of the selectable integration periods for each pixel. The column or pixel address is communicated on bus 1028 to indicate the column selected for readout processing. This signal is decoded by logic in block 1029 and used to generate a signal on 1009 to gate the indication of the integration period used for the pixel to bus 1010 to synchronize its presentation for convenient inclusion as part of the readout value. The analog pixel values sampled in the parallel row read operation may optionally be digitized in block 1029 but are preferably communicated in analog form to bus 1030 for final signal processing and digitization and combining with the indication of the selected integration period communicated on bus 1010. This preferably digitized pixel reading in combination with the indication of the integration period used to acquire the reading provide an indication of the light level to which the pixel was exposed for a very wide range of light levels.

Gate 1038 has the integration period identifying index stored for the pixel as its input and outputs a high level on line 1047 when the index value is still equal to the all one value to which it was initialized at the beginning of the acquisition period indicating that a longer integration period is not in progress for the pixel. Block 1033 is an optional zero offset control function which may be provided, preferably using double correlated sampling, to improve accuracy of pre-sample readings. Compare circuit 1032 functions to compare (preferably in analog form) the pixel reading against a threshold value transmitted on line 1031 and to provide a low output on output line 1008 to indicate that the pixel reading is lower than the threshold value. Flip-flop 1014 is set and its output asserted on line 1003 to enable switching the transfer gate in the selected pixel in the column to its conducting state. As described elsewhere, the transfer gate is switched to its conductive state as part of the reset operation to begin integration and also to transfer light induced charge to the floating diffusion during the pixel readout operation. The output 1046 of gate 1039 is high when a longer integration is not in progress as indicated by a high on line 1047 and the reading is less than the threshold setting as indicated by a low level on line 1031. This is the condition used to conditionally initiate a new, longer integration period by writing the index of the integration period asserted on bus 1017 into memory 1044 to begin the new integration period. Flip-flop 1016 is set to enable writing a new index value to the memory unconditionally when line 1040 is high or when logic output 1046 is high and 1041 is clocked. Flip-flop 1014 is set and its high output asserted on line 1003 to enable switching the transfer gate in the selected pixel in the column to its conducting state. Operation of the transfer gate is provided unconditionally by asserting signal 1036 when 1037 is clocked. This unconditional setting is used for readout of the pixel value and for the initial reset to begin integration for the first pre-sample in the pixel reading sequence and for optional modes of operation where the high dynamic range feature is modified or not used. The output 1047 indicative of the unselected state of the integration period is used by not asserting 1036 when 1037 is clocked to conditionally enable the transfer gate to be switched to its conductive state for operations performed prior to writing a new index to begin a longer integration period for the pixel. The line 1047 which indicates whether or not an integration period is selected for the pixel is used to enable transfer gate transitions to the conductive state to continue until an integration period is selected for the pixel and to then selectively inhibit transitions of the transfer gate in the pixel to its conductive state during the integration period for the pixel until it is read. In the structure described, flip-flop 1016 is first set in response to selection of an integration period and setting of flip-flop 1014 is timed to permit operation of the transfer gate as required to perform the reset operation to initiate the selected integration period. During subsequent tasks performed on the pixel prior to readout, the signal on 1047 is not asserted because of the new index stored in memory for the pixel. This prevents further updates in the selected integration period because flip-flop 1016 is not set and further switching of the transfer gate to its conductive state prior to readout of the pixel is inhibited because flip-flop 1014 is not set.

As noted above, pixel structure 1001 may be derived from a conventional 4T design with the addition of block 1002 to provide selective operation of the transfer gate in the pixel. In the preferred design element 1002 is added to a pixel structure which in other respects preferably conforms to normal 4T pixel design practices. Here it is understood that modifications, such as adjustment of the capacitance of the floating diffusion relative to the pixel capacitance may be made to at least partially optimize performance of the pixel for the application. Block 1002 responds to a combination of signal levels asserted on a control line associated with the row or parallel addressable group to which the pixel belongs (1021) and on a control line (1003) associated with the column of pixels which contains pixel 1001. The function of signals asserted on 1003 include control of the pixel to select between a mode to select an integration period for the pixel and a mode to allow an integration period which has been selected and initiated for the pixel to continue to completion at which point, the light induced, integrated charge on the pixel is read. The functions of signals asserted on 1021 include selection of the pixel in the column on which operations are to be performed. This selection function may be shared, replaced, or augmented by pixel selective functions performed by operation of signals such as the reset signal controlled by 1027 or the row select function controlled by 1026. In a preferred implementation, logic 1002 provides a logical "and" function to switch the transfer gate to its conductive state when signals on 1021 and 1003 both indicate that the transfer gate should be in its conductive state and to maintain the transfer gate in its non-conductive state otherwise. Options to implement the transfer gate function include use of two analog switching devices in series which provide conduction only when both of the series transfer gate devices are conductive. A second and preferable option is to provide a logic "and" function to appropriately drive the transfer gate control input (transfer gate transistor gate) to switch the transfer gate to its conducting or non-conducting states selectively in response to the control signals. With any of the options, special level shifting of signals may be provided to extend the usable dynamic range of the pixel. This may be a normal extension of current practice to provide extended ranges for driving the transfer gate control input or the reset transistor control input to enhance pixel performance and dynamic range.

The logic sequence indicated in FIGS. 9 and 10 with use of the pre-sample readings on which to base conditional selection of the integration period may also be applied to pixel structures which do not have or do not use a transfer gate. In these cases other selective control options may be used to initiate integration and to isolate the pixel so that integration may progress to completion once an integration period has been selected for a pixel. For example, for a 3T pixel, use of selective reset may be substituted for use of selective operation of the transfer gate, and remaining features of the circuits and operations described generally in relation to FIGS. 9 and 10 may be used. This and similar cases are considered to be part of this invention.

Figure 11:
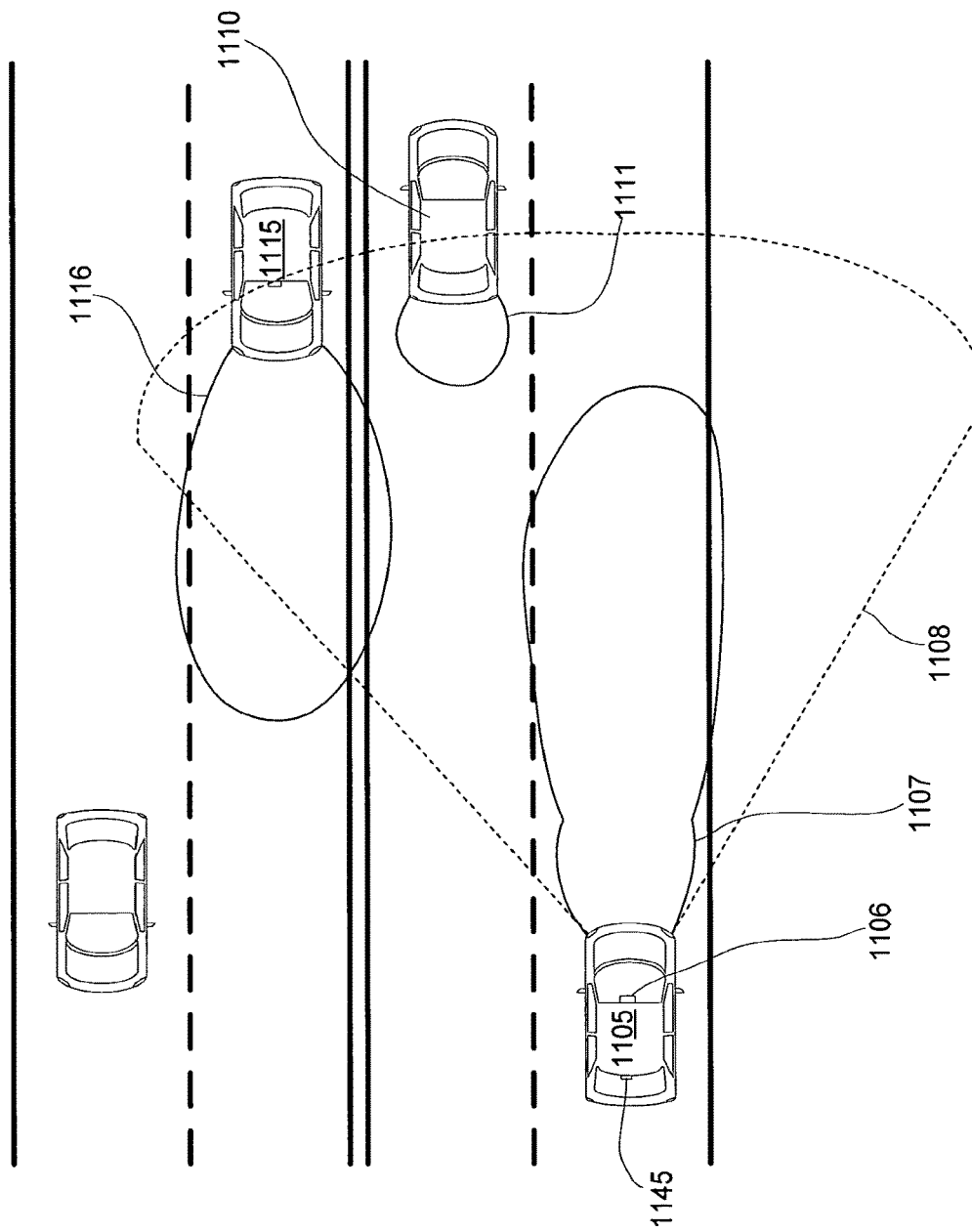
FIG. 11 depicts an automatic vehicle equipment control system.

Referring initially to FIG. 11, for illustrative purposes, an automatic vehicle equipment control system 1106 is shown to be installed within a controlled vehicle 1105. Although the control system 1106 is depicted to be integral with the interior rearview mirror assembly, it should be understood that the control system, or any of the individual components thereof, may be mounted in any suitable location within the interior, or on the exterior, of the controlled vehicle 1105. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 1105 and allow for detection of headlights 1116 of oncoming vehicles 1115 and taillights 1111 of leading vehicles 1110 within the glare zone 1108 associated with the controlled vehicle.

Figure 12:
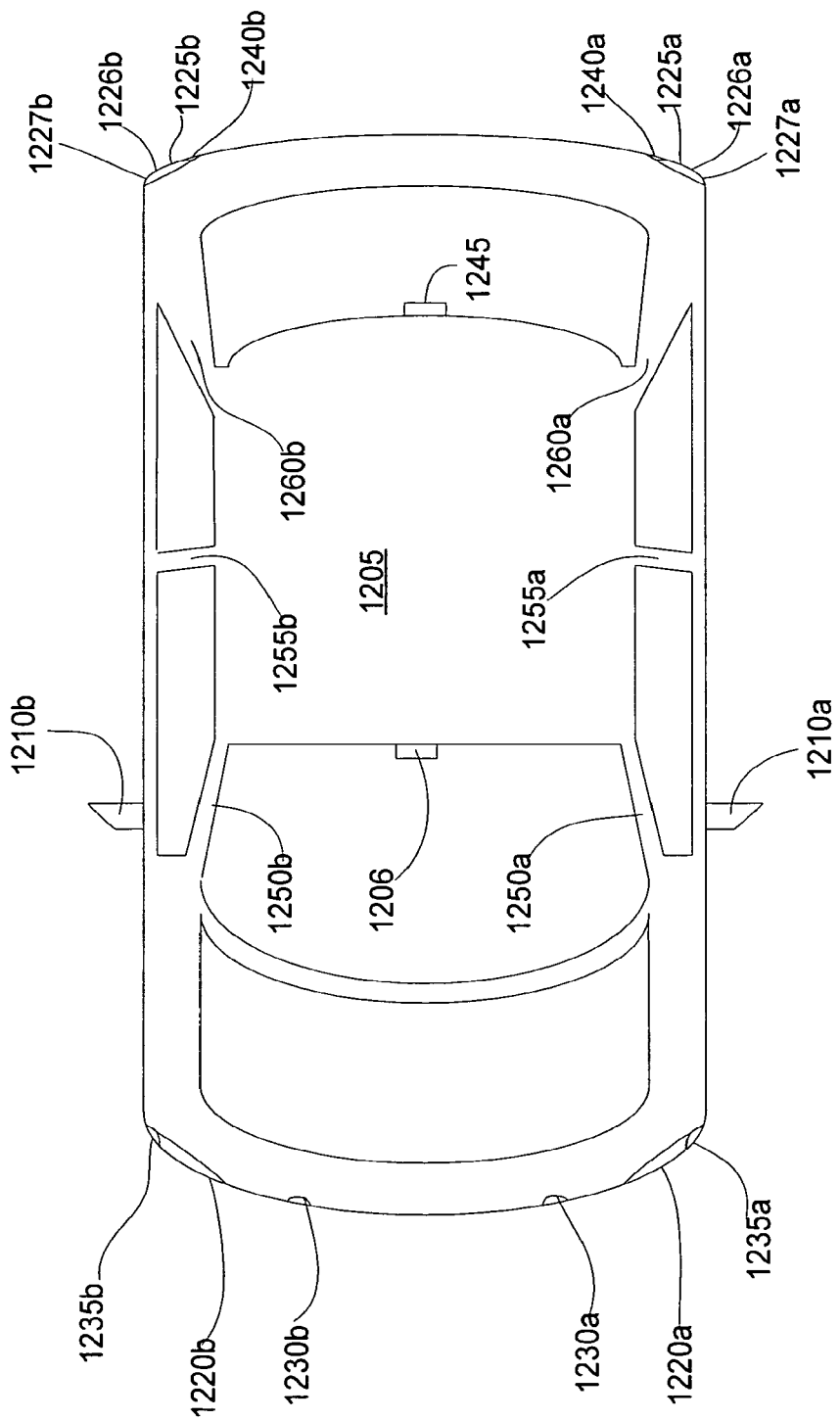
FIG. 12 depicts a controlled vehicle with various equipment.

FIG. 12 depicts a controlled vehicle 1205 comprising an interior rearview mirror assembly 1206 incorporating an automatic vehicle exterior light control system. The processing and control system functions to send configuration data to the imager, receive image data from the imager, to process the images and to generate exterior light control signals. Detailed descriptions of such automatic vehicle exterior light control systems are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235,476, 10/783,431, 10/777,468 and 09/800,460; the disclosures of which are incorporated herein in their entireties by reference. The controlled vehicle is also depicted to include a driver's side outside rearview mirror assembly 1210a, a passenger's side outside rearview mirror assembly 1210b, a center high mounted stop light (CHMSL) 1245, A-pillars 1250a, 1250b, B-pillars 1255a, 1255b and C-pillars 1260a, 1260b; it should be understood that any of these locations may provide alternate locations for an image sensor, image sensors or related processing and, or, control components. It should be understood that any, or all, of the rearview mirrors may be automatic dimming electro-optic mirrors. The controlled vehicle is depicted to include a host of exterior lights including headlights 1220a, 1220b, foil weather lights 1230a, 1230b, front turn indicator/hazard lights 1235a, 1235b, tail lights 1225a, 1225b, rear turn indicator lights 1226a, 1226b, rear hazard lights 1227a, 1227b and backup lights 1240a, 1240b. It should be understood that additional exterior lights may be provided, such as, separate low beam and high beam headlights, integrated lights that comprise multipurpose lighting, etc. It should also be understood that any of the exterior lights may be provided with positioners (not shown) to adjust the associated primary optical axis of the given exterior light. It should be understood that the controlled vehicle of FIG. 12 is generally for illustrative purposes and that suitable automatic vehicle exterior light control systems, such as those disclosed in the patents and patent applications incorporated herein by reference, may be employed along with other features described herein and within disclosures incorporated herein by reference.

Figure 13A:
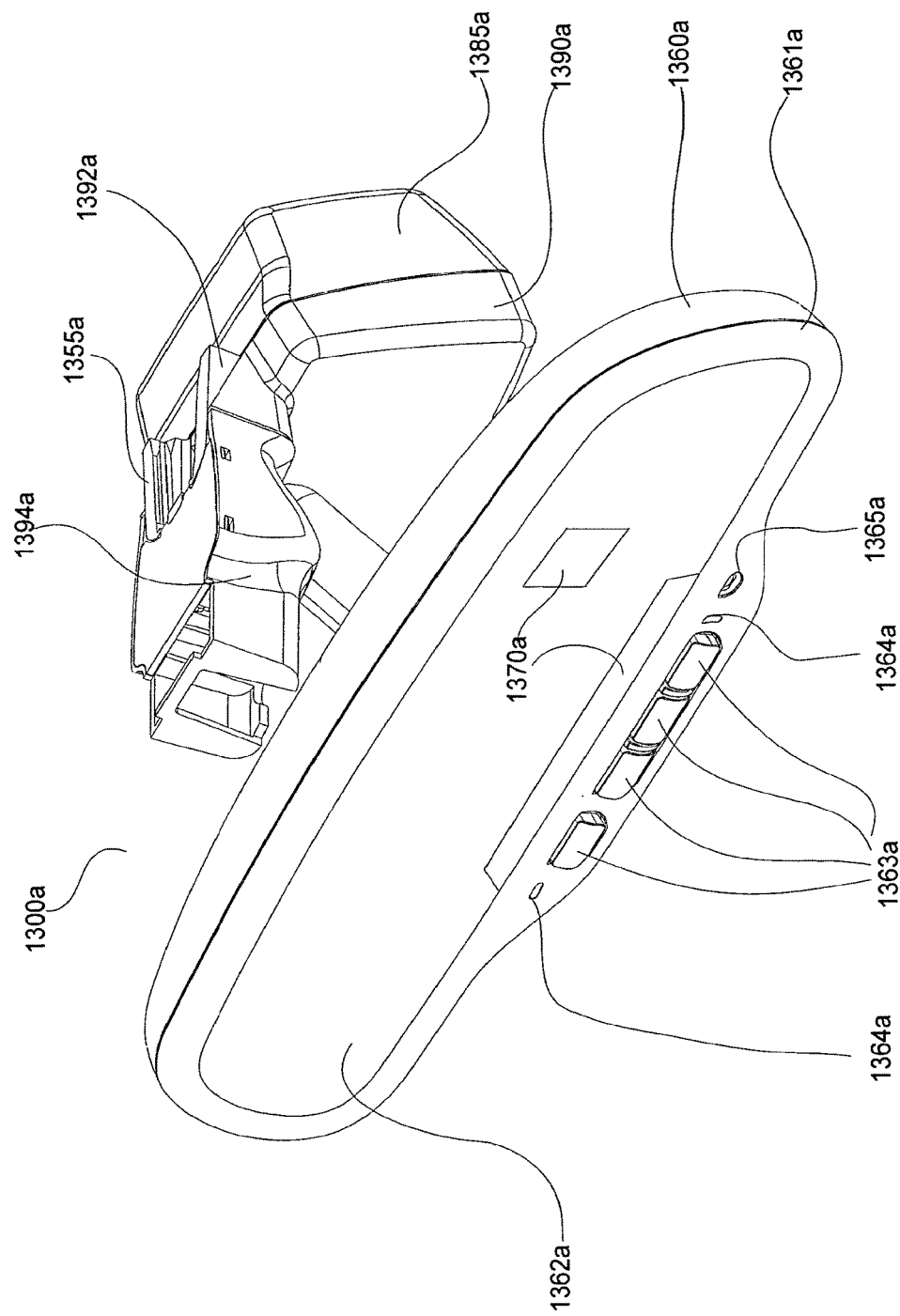
FIGS. 13a and 13b depict a vehicular interior rearview mirror assembly.
Figure 13B:
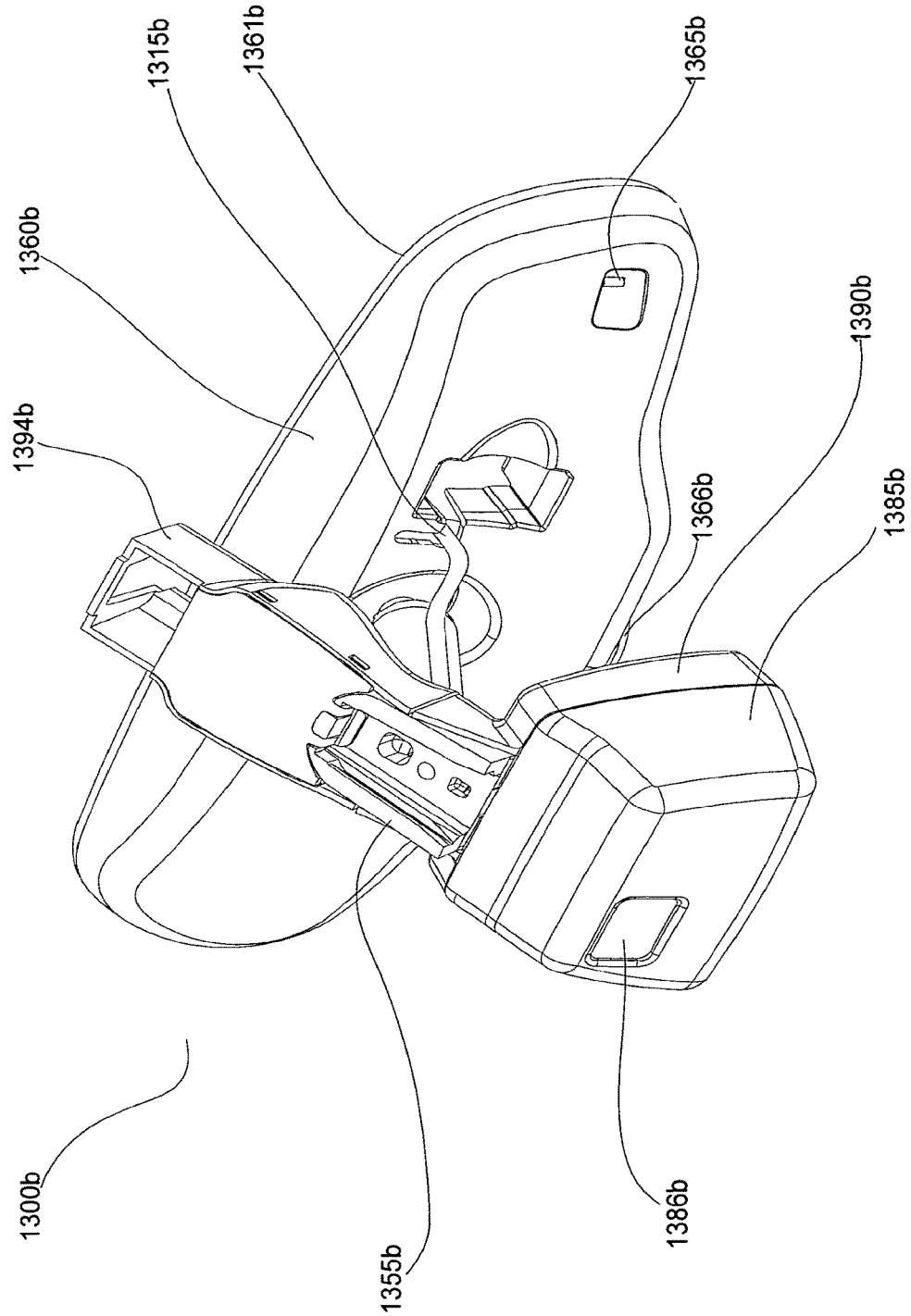

Turning now to FIGS. 13a and 13b, an embodiment of an interior rearview mirror assembly 1300a, 1300b is shown. The mirror assembly includes a stationary accessory assembly enclosed within a front housing 1385a, 1385b and a rear housing 1390a, 1390b. The front housing comprises an aperture 1386b defining an image sensor visual opening. The stationary accessory assembly along with a rearview mirror are carried by an attachment member 1355a, 1355b. The rearview mirror comprises a mirror housing 1360a, 1360b, a bezel 1361a, 1361b and a mirror element 1362a. A wire cover 1394a, 1394b is included to conceal related wiring 1315b. The rearview mirror assembly 1300a, 1300b also incorporates an ambient light sensor 1365b, at least one microphone 1366b, a glare light sensor 1365a, operator interfaces 1363a, indicators 1364a and at least one information display 1370.

Figure 14:
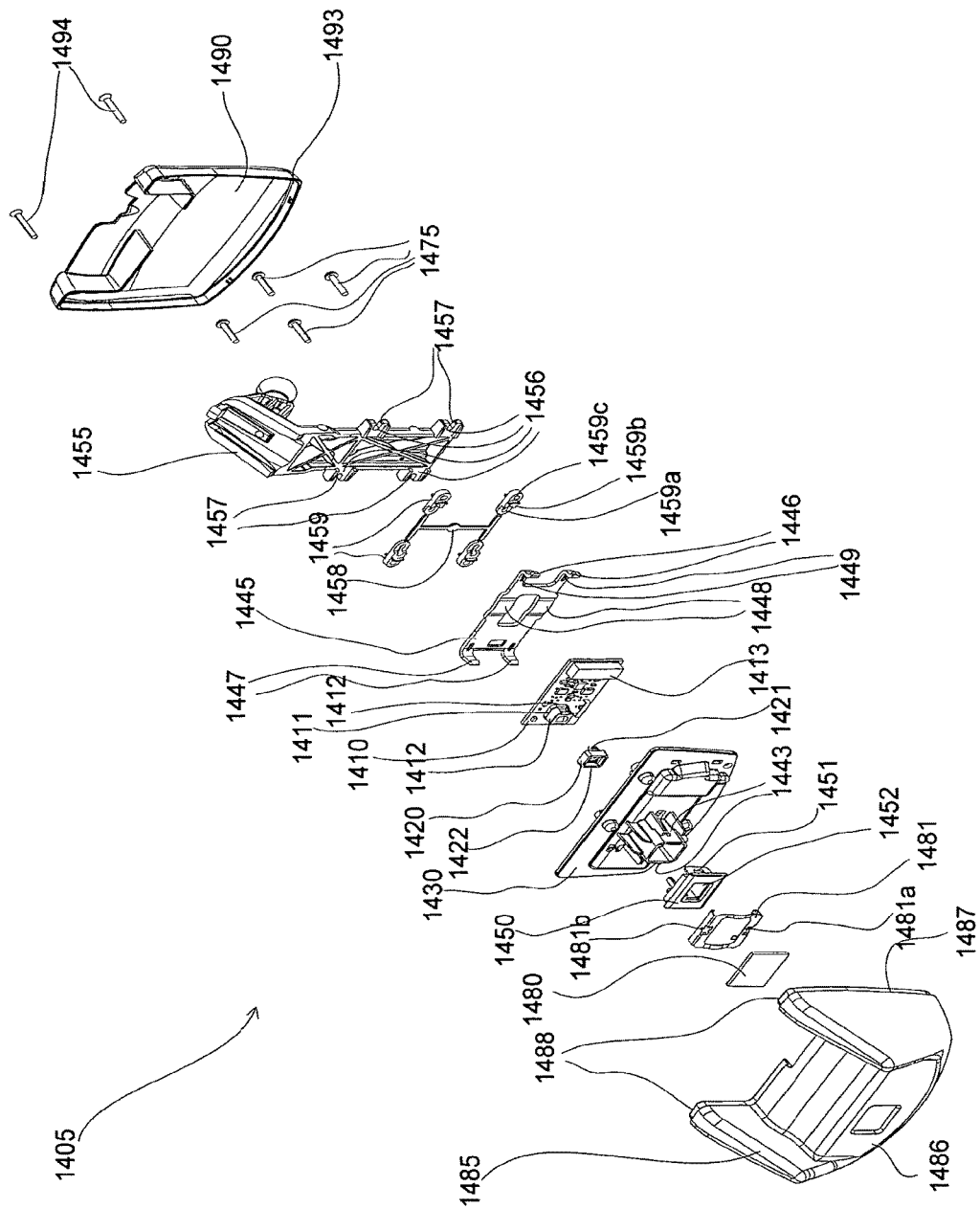
FIG. 14 depicts an exploded, perspective view of an accessory and rearview mirror mount assembly for a vehicle.

Turning now to FIG. 14, there is shown an exploded, perspective, view of an accessory and rearview mirror mount assembly 1405. In a preferred embodiment, the accessory and rearview mirror mount assembly provides a rigid structure for mounting a repositionably mounted interior rearview mirror along with a precisely aligned image sensor either stationarily mounted as described in more detail within commonly assigned U.S. patent application Ser. No. 10/783,273 (7606) or automatically repositioning as described in commonly assigned U.S. patent application Ser. No. 10/645,801, both of which are hereby incorporated in their entireties herein by reference. A preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the image sensor is preferred. It should be understood that the present invention has broad application to light sensing optics generally, in addition to, automotive and consumer electronics applications.

Imager board 1410 is provided with an image sensor with lens 1411. In a preferred embodiment, the imager board will also include an image sensor control logic and timing circuit, communication line drivers and wire harness receptacle 1413. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. In at least one embodiment, the image sensor with lens 1411 includes lens cover snap portions 1412 for engaging a lens cover 1420 snap clips 1421. The lens cover has an aperture 1422 for alignment with the optical axis of the image sensor and lens. Various suitable optical systems, such as those depicted and described in commonly assigned U.S. Pat. Nos. 5,990,469; 6,008,486; 6,130,421; 6,130,448; 6,049,171; and 6,403,942 and U.S. Patent Application Ser. No. 60/495,906 (2880); the disclosures of which are incorporated herein in their entireties by reference; may be employed. It should be understood that optics in accordance with the present invention may obviate the need for a lens cover 1420 as described in detail herein. It should be understood that the lens cover snap portions, the lens optical cover and snap clips may be eliminated with use of optical elements in accordance with the present invention. In at least one embodiment, the "lens cover" is formed on a molded organic material optics element using a laser as described in detail herein.

An imager board wiring harness (not shown) is preferably provided with plugs on either end thereof. The imager board is preferably provided with a male receptacle 1413 for receiving one of the plugs of the imager board wiring harness (not shown).

Figure 15:
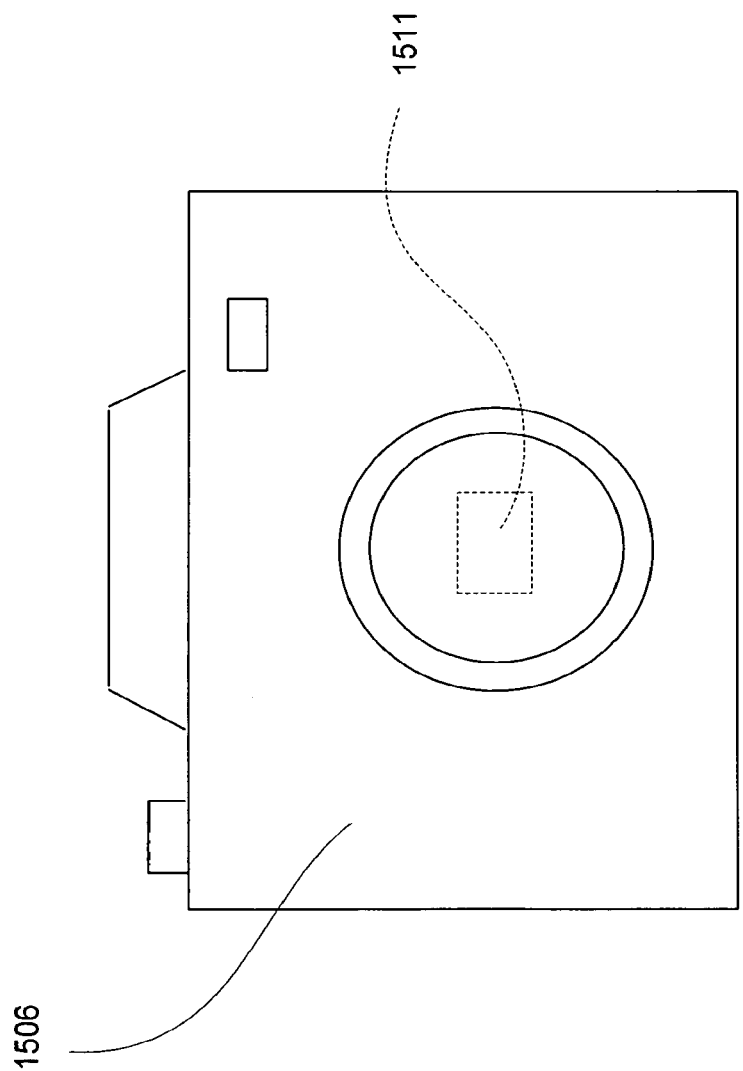
FIG. 15 depicts a profile view of a digital camera.

FIG. 15 depicts a profile view of a digital camera 1506 in accordance with the present invention having an imager with lens 1511. It should be understood that optics in accordance with the present invention may be incorporated into a host of assemblies included, but not limited to, light sensing, image acquisition, moisture sensing, rear-vision systems, lane departure detection systems, adaptive cruse control systems, occupancy detection systems, security systems, vision systems, color measurement systems, head lamp control systems, variable reflectance rearview mirror control systems, digital video recorders and digital cameras.

It should be understood that the above detail description is provided for enabling one of ordinary skill in the art to make and use the invention as recited in the appending claims. In know way should this description be interpreted as limiting the scope of the invention to any given embodiment, therefore, the appending claims are intended to include all equivalent structure and equivalent function within the respective scope.

What is claimed is:

1. An imaging device, comprising:
an array of pixels partitioned into at least 16 parallel addressable groups of pixels, each of the parallel addressable group of pixels independently selectable and the active pixels of each of the parallel addressable group of pixels subject to at least one specified task;
wherein the at least one specified task is a selective reset task performed as a single task simultaneously operating on at least a substantial subset of active pixels of a selected one of the parallel addressable group of pixels; wherein the selective reset task determines active pixels to selectively reset and performs the reset selectively according to a determination and recordation of an indication of a reset for each individual pixel which is reset, the at least one specified task performed in parallel for at least a substantial subset of pixels in said selected parallel addressable group of pixels.

2. The imaging device of claim 1, wherein each of the parallel addressable group of pixels defines a substantial portion of one of a row of pixels in the array of pixels or a column of pixels in the array of pixels.

3. The imaging device of claim 1, wherein the parallel addressable group of pixels comprises a group of commonly spectral filtered pixels of a series of Bayer patterned spectrally filter pixels.

4. The imaging device of claim 1, further comprising a row of reset control circuits, each of the reset control circuits are linked via an associated communication path to an individual pixel in the selected parallel addressable group of pixels.

5. The selective reset task of claim 4, wherein the selective reset task comprises the row of reset control circuits that are configured to perform the selective reset of pixels in the selected parallel addressable group of pixels in a substantially parallel operation.

6. The imaging device of claim 1, wherein comparators and logic circuits perform selective reset functions and are partitioned into similar blocks each of which operate on one or more pixels of the selected parallel addressable group of pixels with the logic in the blocks at least partially duplicated from one block to the next.

7. The imaging device of claim 1, wherein pixels of a parallel addressable group are sampled at least partially in parallel and digitized using sequential tasks which partially overlap selective reset tasks.

8. The imaging device of claim 1, wherein pixels of a first parallel addressable group of pixels are first reset to begin a first pre-sample period and subsequently are subjected to a series of conditional resets to conditionally reset pixels on a pixel by pixel basis and to initiate an integration period for a new pre-sample or for an integration period selected for the pixel.

9. The imaging device of claim 8, wherein determination to reset a pixel and to initiate a selectable integration period is based at least in part on a result of a comparison of an indication of a charge accumulated on any given pixel during a pre-sample period to a threshold level.

10. The imaging device of claim 8, wherein a record is maintained in a corresponding memory for each pixel indicating if an integration period has been selected for the pixel and if so what integration period has been selected for the pixel.

11. The imaging device of claim 8, wherein conditional reset to begin an additional pre-sample period is bypassed for a given active pixel if a value recorded in the memory for the given active pixel indicates that an integration period has been selected for the given active pixel.

12. The imaging device of claim 8, wherein integrated charge on a pixel is digitized only once for each pixel which is read.

* * * * *